(12) United States Patent
Svendsen et al.

(10) Patent No.: US 11,748,833 B2
(45) Date of Patent: Sep. 5, 2023

(54) SYSTEMS AND METHODS FOR A THEME-BASED EFFECTS MULTIMEDIA EDITING PLATFORM

(71) Applicant: WeVideo, Inc., Mountain View, CA (US)

(72) Inventors: Jostein Svendsen, Saratoga, CA (US); Bjørn Rustberggaard, Nesøya (NO); Krishna Menon, Saratoga, CA (US)

(73) Assignee: WeVideo, Inc., Mountain View, CA (US)

( * ) Notice: Subject to any disclaimer, the term of this patent is extended or adjusted under 35 U.S.C. 154(b) by 512 days.

(21) Appl. No.: 14/181,577

(22) Filed: Feb. 14, 2014

(65) Prior Publication Data

US 2014/0258101 A1  Sep. 11, 2014

Related U.S. Application Data

(60) Provisional application No. 61/773,021, filed on Mar. 5, 2013.

(51) Int. Cl.
   *G06Q 50/18* (2012.01)
   *G06Q 20/12* (2012.01)

(52) U.S. Cl.
   CPC ......... *G06Q 50/184* (2013.01); *G06Q 20/123* (2013.01)

(58) Field of Classification Search
   CPC . G06Q 50/184; G06Q 20/1235; G06Q 20/123
   See application file for complete search history.

(56) References Cited

U.S. PATENT DOCUMENTS

| 4,932,054 A | 6/1990 | Chou et al. |
| 4,977,594 A | 12/1990 | Shear |
| 5,247,575 A | 9/1993 | Sprague et al. |

(Continued)

FOREIGN PATENT DOCUMENTS

EP   2068251 A2 *  6/2009  ............ G06F 17/211

OTHER PUBLICATIONS

Video as Digital Object: Production and Distribution of Video Content in the Internet Media Ecosystem, Kallinikos, The Information society, 2011, vol. 27 (5), p. 281-294.*

(Continued)

*Primary Examiner* — Ilse I Immanuel
(74) *Attorney, Agent, or Firm* — Ahmann Kloke LLP

(57) ABSTRACT

Systems and methods described herein relate to creating or modifying multimedia content using theme-based effects. In accordance with some implementations, a method can comprise the operations of: accessing foundational content; receiving a request to apply a theme to the foundational content; receiving a theme-based effect associated with the theme; receiving a licensing parameter of use associated with the theme; and applying the theme-based effect to the foundational content according to the licensing parameter. Themes can include those created by third-party vendors and those created by one or more users of a method or system implementing features described herein. Additionally, use of different themes can vary in cost and/or use limitations, which can be determined according to licensing parameters associated with the themes.

10 Claims, 10 Drawing Sheets

(56) References Cited

U.S. PATENT DOCUMENTS

| | | | |
|---|---|---|---|
| 5,841,512 A * | 11/1998 | Goodhill | G11B 27/031 348/441 |
| 6,351,765 B1 | 2/2002 | Pietropaolo et al. | |
| 6,388,668 B1 | 5/2002 | Elliott | |
| 6,442,283 B1 | 8/2002 | Tewfik et al. | |
| 6,546,188 B1 | 4/2003 | Ishii et al. | |
| 7,120,859 B2 | 10/2006 | Wettach | |
| 7,213,051 B2 | 5/2007 | Zhu et al. | |
| 7,375,768 B2 | 5/2008 | Herberger et al. | |
| 7,437,673 B2 | 10/2008 | Hyman et al. | |
| 7,587,509 B1 | 9/2009 | Edelman et al. | |
| 7,594,039 B2 | 9/2009 | Shima | |
| 7,617,278 B1 | 11/2009 | Edelman et al. | |
| 7,769,819 B2 | 8/2010 | Lerman et al. | |
| 7,809,802 B2 | 10/2010 | Lerman et al. | |
| 7,840,661 B2 | 11/2010 | Kalaboukis et al. | |
| 7,934,011 B2 | 4/2011 | Gavin et al. | |
| 7,945,615 B1 | 5/2011 | Shetty et al. | |
| 7,945,916 B1 | 5/2011 | Lozben et al. | |
| 8,051,287 B2 | 11/2011 | Shetty et al. | |
| 8,136,127 B1 | 3/2012 | Lozben et al. | |
| 8,156,176 B2 | 4/2012 | Lerman et al. | |
| 8,161,159 B1 | 4/2012 | Shetty et al. | |
| 8,166,191 B1 | 4/2012 | Swaminathan et al. | |
| 8,176,115 B2 | 5/2012 | Eves et al. | |
| 8,205,154 B2 | 6/2012 | Doepke et al. | |
| 8,209,611 B2 | 6/2012 | Yoshimine | |
| 8,209,618 B2 | 6/2012 | Garofalo | |
| 8,218,830 B2 | 7/2012 | Gavin et al. | |
| 8,225,228 B2 | 7/2012 | Marinkovich et al. | |
| 8,245,188 B2 | 8/2012 | Hertenstein | |
| 8,265,457 B2 | 9/2012 | Baum et al. | |
| 8,270,815 B2 | 9/2012 | Yen et al. | |
| 8,286,069 B2 | 10/2012 | Gavin et al. | |
| 8,302,008 B2 | 10/2012 | Hertenstein | |
| 8,331,735 B2 | 12/2012 | Lee et al. | |
| 8,341,525 B1 | 12/2012 | Achour et al. | |
| 8,411,758 B2 | 4/2013 | Folgner et al. | |
| 8,412,841 B1 | 4/2013 | Swaminathan et al. | |
| 8,422,852 B2 * | 4/2013 | Suri | H04N 9/80 386/239 |
| 8,433,611 B2 | 4/2013 | Lax et al. | |
| 8,451,276 B2 | 5/2013 | Jung | |
| 8,495,092 B2 | 7/2013 | Piccionelli et al. | |
| 8,510,441 B2 | 8/2013 | Ooi et al. | |
| 8,532,469 B2 | 9/2013 | Fiumi | |
| 8,554,734 B1 | 10/2013 | Chatterjee et al. | |
| 8,577,204 B2 | 11/2013 | Lin et al. | |
| 8,639,086 B2 | 1/2014 | Chen et al. | |
| 8,667,016 B2 | 3/2014 | Sims et al. | |
| 8,667,532 B2 | 3/2014 | Heath | |
| 8,695,031 B2 | 4/2014 | Kumar et al. | |
| 8,719,865 B2 | 5/2014 | Moonka et al. | |
| 8,749,618 B2 | 6/2014 | Fiumi | |
| 8,788,941 B2 | 7/2014 | Hedges | |
| 8,806,346 B2 | 8/2014 | Hedges | |
| 8,812,672 B2 | 8/2014 | Ramaley et al. | |
| 8,831,999 B2 | 9/2014 | Bolton et al. | |
| 8,868,465 B2 | 10/2014 | Folgner et al. | |
| 8,910,045 B2 | 12/2014 | Baum | |
| 8,935,236 B2 | 1/2015 | Morita et al. | |
| 8,935,611 B2 | 1/2015 | Oberbrunner et al. | |
| 8,966,402 B2 | 2/2015 | Lu et al. | |
| 8,984,406 B2 | 3/2015 | Pueyo et al. | |
| 9,009,581 B2 | 4/2015 | Herberger et al. | |
| 9,026,446 B2 | 5/2015 | Fiumi | |
| 9,032,297 B2 | 5/2015 | Lovejoy et al. | |
| 9,032,298 B2 | 5/2015 | Segal et al. | |
| 2001/0041050 A1 | 11/2001 | Iwata et al. | |
| 2002/0083324 A1 | 6/2002 | Hirai | |
| 2002/0091835 A1 | 7/2002 | Lentini et al. | |
| 2002/0116716 A1 | 8/2002 | Sideman | |
| 2002/0144130 A1 | 10/2002 | Rosner et al. | |
| 2002/0181732 A1 | 10/2002 | Safavi-Naini et al. | |
| 2002/0181738 A1 | 12/2002 | Nakamura et al. | |
| 2003/0233462 A1 | 12/2003 | Chien | |
| 2004/0078825 A1 | 4/2004 | Murphy | |
| 2005/0289068 A1 | 12/2005 | Stefik et al. | |
| 2006/0251383 A1 | 11/2006 | Vronay et al. | |
| 2006/0259589 A1 | 11/2006 | Lerman et al. | |
| 2007/0106419 A1 | 5/2007 | Rachamadugu | |
| 2007/0107032 A1 | 5/2007 | Rachamadugu | |
| 2007/0162855 A1 | 7/2007 | Hawk et al. | |
| 2007/0198534 A1 | 8/2007 | Hon et al. | |
| 2007/0208442 A1 | 9/2007 | Perrone | |
| 2007/0250901 A1 | 10/2007 | McIntire et al. | |
| 2007/0277108 A1 | 11/2007 | Orgill et al. | |
| 2007/0300158 A1 * | 12/2007 | Kasperkiewicz | G06F 17/30017 715/731 |
| 2008/0065771 A1 | 3/2008 | Marvit et al. | |
| 2008/0112683 A1 * | 5/2008 | Lin | G11B 27/034 386/278 |
| 2008/0123976 A1 | 5/2008 | Coombs et al. | |
| 2008/0155614 A1 | 6/2008 | Cooper et al. | |
| 2008/0165388 A1 | 7/2008 | Serlet | |
| 2008/0183608 A1 | 7/2008 | Gavin et al. | |
| 2008/0183844 A1 | 7/2008 | Gavin et al. | |
| 2008/0193100 A1 | 8/2008 | Baum et al. | |
| 2008/0208692 A1 * | 8/2008 | Garaventi | G07F 17/0014 705/40 |
| 2008/0243727 A1 | 10/2008 | Weber et al. | |
| 2008/0301228 A1 | 12/2008 | Flavin | |
| 2009/0007267 A1 | 1/2009 | Hoffman | |
| 2009/0094147 A1 | 4/2009 | Fein et al. | |
| 2009/0157608 A1 | 6/2009 | Stratheam et al. | |
| 2009/0183081 A1 | 7/2009 | Rodriguez et al. | |
| 2009/0196570 A1 | 8/2009 | Dudas et al. | |
| 2010/0004944 A1 | 1/2010 | Palaniappan | |
| 2010/0169127 A1 | 7/2010 | Malackowski et al. | |
| 2010/0169779 A1 | 7/2010 | Mason et al. | |
| 2010/0192072 A1 | 7/2010 | Spataro et al. | |
| 2010/0226525 A1 | 9/2010 | Levy et al. | |
| 2010/0257457 A1 | 10/2010 | De Goes | |
| 2010/0260468 A1 | 10/2010 | Khatib et al. | |
| 2010/0269048 A1 | 10/2010 | Pahlavan | |
| 2010/0285884 A1 | 11/2010 | Gauer et al. | |
| 2011/0026898 A1 | 2/2011 | Lussier et al. | |
| 2011/0026899 A1 | 2/2011 | Lussier et al. | |
| 2011/0026900 A1 | 2/2011 | Lussier | |
| 2011/0029883 A1 | 2/2011 | Lussier et al. | |
| 2011/0143631 A1 * | 6/2011 | Lipman | A63H 30/04 446/175 |
| 2011/0167353 A1 | 7/2011 | Grosz et al. | |
| 2011/0213655 A1 | 9/2011 | Henkin et al. | |
| 2011/0214045 A1 | 9/2011 | Sumler et al. | |
| 2011/0246554 A1 | 10/2011 | Bury et al. | |
| 2011/0246892 A1 | 10/2011 | Hedges | |
| 2011/0282727 A1 | 11/2011 | Phan et al. | |
| 2011/0288910 A1 | 11/2011 | Garg et al. | |
| 2011/0314390 A1 | 12/2011 | Park et al. | |
| 2012/0033948 A1 | 2/2012 | Rodriguez et al. | |
| 2012/0079606 A1 | 3/2012 | Evans et al. | |
| 2012/0130954 A1 | 5/2012 | Hood | |
| 2012/0189282 A1 | 7/2012 | Wyatt et al. | |
| 2012/0245952 A1 | 9/2012 | Halterman et al. | |
| 2012/0251080 A1 | 10/2012 | Svendsen et al. | |
| 2012/0251083 A1 | 10/2012 | Svendsen | |
| 2012/0254752 A1 | 10/2012 | Svendsen | |
| 2012/0254778 A1 | 10/2012 | Svendsen | |
| 2012/0284176 A1 | 11/2012 | Svendsen et al. | |
| 2012/0314025 A1 | 12/2012 | Fiumi | |
| 2013/0007669 A1 | 1/2013 | Lu et al. | |
| 2013/0064110 A1 * | 3/2013 | Polinati | H04L 41/5035 370/252 |
| 2013/0111326 A1 | 5/2013 | Lockhart et al. | |
| 2013/0132462 A1 | 5/2013 | Moorer | |
| 2013/0275886 A1 | 10/2013 | Haswell et al. | |
| 2013/0311556 A1 | 11/2013 | Srivastava et al. | |
| 2014/0047413 A1 | 2/2014 | Sheive et al. | |
| 2014/0096020 A1 | 4/2014 | Grosz et al. | |
| 2014/0121017 A1 | 5/2014 | Mandryk et al. | |
| 2014/0143218 A1 | 5/2014 | Sanghavi et al. | |
| 2014/0255009 A1 | 9/2014 | Svendsen et al. | |

(56) References Cited

U.S. PATENT DOCUMENTS

2014/0317506 A1    10/2014   Rustberggaard
2015/0050009 A1     2/2015   Svendsen
2017/0131855 A1*   5/2017   Svendsen ............. G11B 27/031
2019/0325913 A1    10/2019   Svendsen et al.

OTHER PUBLICATIONS

Apple Inc., "Final Cut Pro 7 User Manual," pp. 1-2, 1553-1583, 1995-2030, (2010).

Jokela, Tero et al., "Mobile Video Editor: Design and Evaluation," Proceedings of the 12th International Conference on Human-Computer Interaction: Interaction Platforms and Techniques, pp. 344-353 (Jul. 2007).

VideoToolbox.com, "Video Toolbox—advanced online video editor. Convert, crop, merge or record videos with just a few clicks." (2009) [retrieved from the Internet at http://www.videotoolbox.com/ on Apr. 10, 2014].

\* cited by examiner

SYSTEMS AND METHODS FOR A THEME-BASED EFFECTS MULTIMEDIA EDITING PLATFORM

CROSS REFERENCE TO RELATED APPLICATIONS

This application claims priority to U.S. Provisional Patent Application No. 61/773,021, filed Mar. 5, 2013, entitled "SYSTEMS AND METHODS FOR A THEME-BASED EFFECTS MULTIMEDIA EDITING PLATFORM, which is incorporated herein by reference.

BACKGROUND

With conventional editing equipment, creative professionals use physical media to capture specific scenes and manually add soundtracks, video clips, and special effects to incorporate creative elements like story elements, plots, characters, and thematic elements. The process provides a classical touch and feel that aligned with the creative energies of film producers, directors, screenwriters, and editors. However, the process can be expensive, time-consuming and complicated, sometimes requiring access to editing equipment typically located in film studios.

Locally installed film editing systems, such as standalone computer programs, allow users to edit digital multimedia using locally stored special effects, including those relating to pre-defined themes. Pre-defined themes usually include a set of special effects that correspond to the theme and that permit a user, particularly a novice user, to simply and easily enhance their multimedia content. However, locally installed film editing systems require users to purchase special effects packages, limiting a user to the editing effects and pre-defined themes locally installed on his or her computer. Further, the application of pre-defined themes often requires the content being modified to be adjusted to fit the theme being applied. As such, locally installed film editing systems make it hard for users to add themes to streaming media.

The foregoing examples of film editing systems are intended to be illustrative and not exclusive. Other limitations of the art will become apparent to those of skill in the relevant art upon a reading of the specification and a study of the drawings.

SUMMARY

The present application discloses systems and methods of creating or modifying content (e.g., video or audio content) using a theme. Generally, a given theme can include one or more audio or visual effects relating to the given theme (i.e., theme-based effects). Accordingly, a theme can include a set of theme-based effects that, upon application to content, can cause at least a portion of content to be stylized in accordance with aspects of the theme. In doing so, a theme once applied to content can augment the content with thematic elements that impart a theme-related look, feel, or tone to one or more portions of content. For various implementations, the theme can augment the content while preserving the underlying content being presented.

When applying the theme, systems and methods can adapt (e.g., adjust or modify) one or more timelines associated with the theme according to temporal characteristics of the content timeline associated with foundational content. For instance, where a theme-based effect included in the theme has an associated effect timeline, that effect timeline can be adjusted relative (e.g., aligned with) one or more temporal elements (also referred to herein as "timeline cues" or "cues") associated with the content timeline of the foundational content. The adjustment to the associated effect timeline can include a change in duration of the theme-based effect and/or change in temporal elements in the associated effect timeline (e.g., temporal triggers). Adjustment of the associated effect timeline can be facilitated automatically in accordance with some or all of the temporal elements of the content timeline associated with the foundational content. For the foundational content, cues in the content timeline can indicate the temporal beginning or temporal end of certain portions of the content, and can also indicate temporal position of transitions between different portions of the content. For instance, where the content comprises a sequence of two or more video clips, two or more audio clips, video transitions, or audio transitions, the timeline cues can define the start and stop times for such elements within the content.

As noted herein, the theme-based effect can comprise an audio or visual effect configured to overlay the foundational content. For some implementations, the theme-based effect can comprise an audio or visual effect triggered according to at least one cue in the set of cues associated with the content timeline. Depending on the implementation, the theme-based effect can comprise an animation layer, a static layer, a title, a transition, a lower third, a caption, a color correction layer, or a filter layer.

Generally, the associated content timeline of the foundational content can comprise information defining a layer of the foundational content, defining content within the layer, and defining a temporal property of content within the layer. Likewise, the associated effect timeline of the theme-based effect can comprise information defining a layer of the theme-based effect, defining one or more audio or visual effects within the layer, and defining a temporal property of the audio or visual effects within the layer.

Themes can comprise one or more layers of theme-based effects, which may be audio or visual in nature and facilitate the overall effect of the theme on the content being created or modified. Example layers can include soundtrack layers, sound effect layers, animated visual layers, static visual layers, color adjustment layers, and filter layers. Example theme-based effects included in the theme can include visual overlays (e.g., animated or static images/graphics), text-based overlays (e.g., captions, titles, and lower thirds), transitions (e.g., visual or audio transitions between content portions), audio overlays (e.g., soundtracks and sound effects), and the like. Example themes can include those relating to fashion (e.g., fashionista theme), traveling (e.g., journeys or vacations), time eras (e.g., vintage theme or disco theme), events (e.g., party-related themes), genres of book, music or movies (e.g., punk rock music or black noir movies), and the like. Particular implementations can provide separation between editing processes associated with content the user intends to enhance using the theme (e.g. sequence of content portions and content transitions), and audio/visual styling processes of theme that enhance the underlying content.

Themes can include those created by third-party vendors and those created by one or more users of a method or system implementing features described herein. Additionally, use of different themes can vary in cost and/or use limitations, which can be determined according to licensing parameters associated with the themes (e.g., licensing rights and permissions). As understood herein, a licensing parameter associated with a theme can include a licensing parameter associated with one or more theme-based effects associated with the theme. In some implementations, a licensing parameter associated with a theme can supersede any licensing parameters individually associated with the theme-based effects that facilitate the theme.

According to certain implementations, systems and methods can apply one or more theme-based effects of a theme to one or more portions of content a user intends to enhance (hereafter, referred to as "foundational content"), while preserving a content timeline associated with the foundational content. For some implementations, a system can include: a theme-based effects content editing engine; a theme-based effects library engine; a theme-based effects library datastore comprising a theme that includes one or more theme-based effects corresponding to the theme; and a theme-based effects licensing management engine coupled to the theme-based effects content editing engine. In operation, the theme-based effects content editing engine can receive a request to apply the theme to foundational content being accessed by the theme-based effects content editing engine, the theme-based effects library engine can provide to the theme-based effects content editing engine (from the theme-based effects library datastore) a theme-based effect associated with the theme, the theme-based effects licensing management engine provides to the theme-based effects content editing engine a licensing parameter of use associated with the theme, and the theme-based effects content editing engine applies the theme-based effect to the foundational content according to the licensing parameter. As used herein, "theme-based foundational content" can refer to foundational content after application of a theme.

The licensing parameter can comprise a use limitation associated with the theme, a cost associated with the theme, and/or the like. In some implementations, the system can further include a theme-based effects payment engine that provides the licensing parameter to the theme-based effects payment engine to charge for use of the theme-based effect according to the cost. The system can further include a theme-based effects payment engine coupled to the theme-based effects content editing engine and comprising a payment processing engine for processing a payment, and a theme-based effect access control engine that permits application of the theme-based effect to the foundational content based on a condition selected from a group consisting of an amount of the payment and a success in processing the payment. For implementations, the theme-based effect access control engine that permits rendering of the foundational content, after application the theme-based effect to the foundational content, based on a condition selected from a group consisting of an amount of the payment and a success in processing the payment.

A system can further include a theme-based effects content render engine, and a theme-based effects content publication engine. In operation, after the theme-based effect is applied to the foundational content, the theme-based effects content render engine can generate from the theme-based foundational content a rendered theme-based content product, wherein the theme-based rendered content product is consumable by another user. The theme-based effects content publication engine can publish the rendered theme-based content product for consumption by another user. The foundational content can be provided by a user of the system (e.g., user-sourced content). The foundational content can also be for-purchase content, possibly created by a third-party vendor or another user.

Additionally, some implementations provide for methods that can perform various operations described herein. For instance, a method can include: accessing foundational content; receiving a request to apply a theme to the foundational content; receiving a theme-based effect associated with the theme; receiving a licensing parameter of use associated with the theme; and applying the theme-based effect to the foundational content according to the licensing parameter. The method can further include processing the payment from a user, where applying the theme-based effect to the foundational content, rendering the rendered content product from the foundational content, or both are permitted based on an amount of the payment, a success in processing the payment, and/or some other payment related condition.

DETAILED DESCRIPTION

This paper describes techniques that those of skill in the relevant art can implement in numerous ways. For instance, those of skill in the relevant art can implement the techniques described herein using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
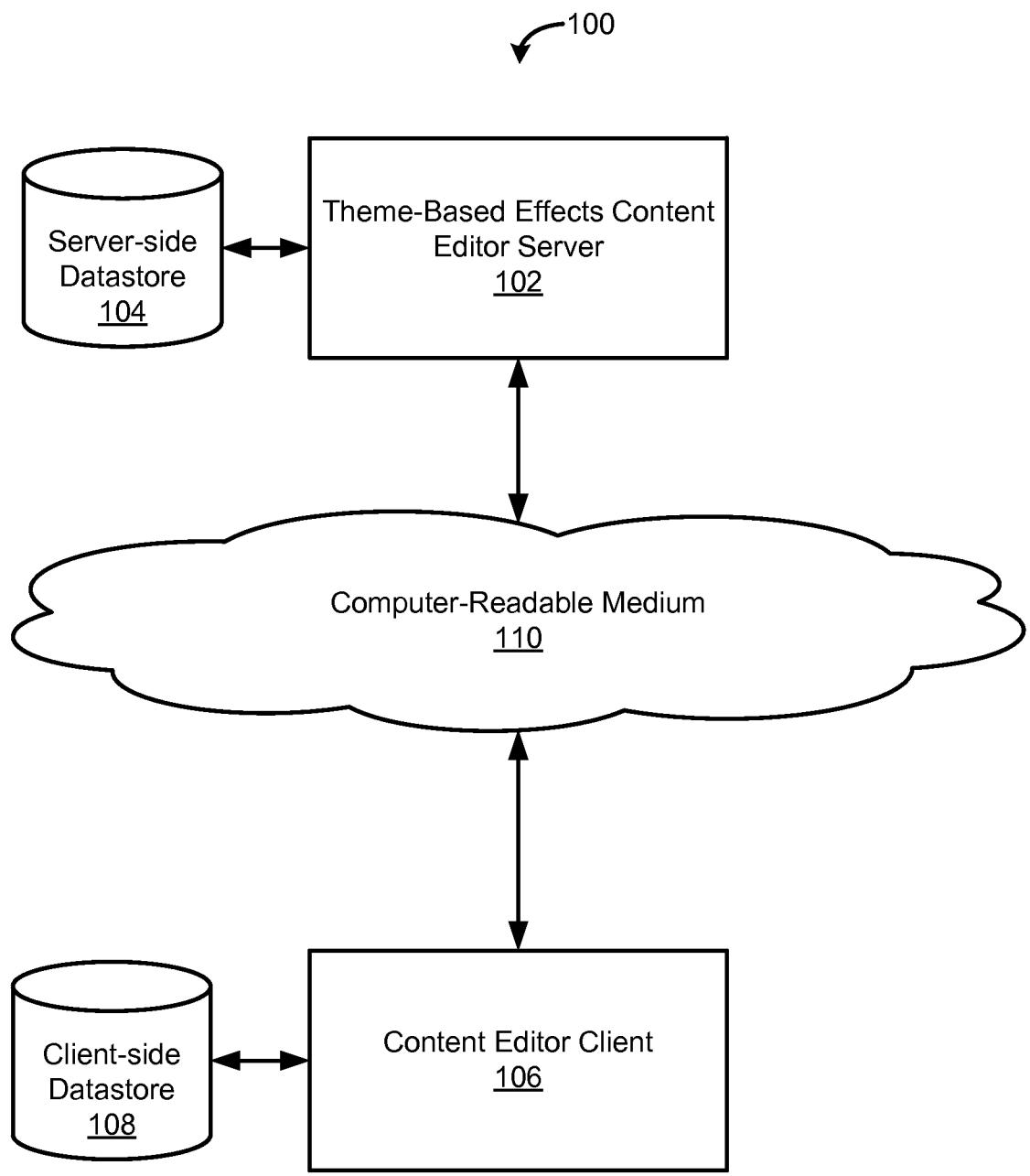
FIG. 1 depicts a diagram of an example of a system for theme-based effects content editing in accordance with various implementations.

FIG. 1 depicts a diagram of an example of a system 100 for theme-based effects content editing in accordance with various implementations. In the example of FIG. 1, the system 100 can include a theme-based effects content editor server 102, a server-side datastore 104 coupled to the theme-based effects content editor server 102, a content editor client 106, a client-side datastore 108 coupled to the content editor client 106, and a computer-readable medium 110 coupled between the theme-based effects content editor server 102 and the content editor client 106.

As used in this paper, the term "computer-readable medium" is intended to include only physical media, such as a network, memory or a computer bus. Accordingly, in some implementations, the computer-readable medium can permit two or more computer-based components to communicate with each other. For example, as shown in FIG. 1, the computer-readable medium 110 can be a network, which can couple together the theme-based effects content editor server 102 and the content editor client 106. Accordingly, for some implementations, the computer-readable medium 110 can facilitate data communication between the theme-based effects content editor server 102 and the content editor client 106.

As a network, the computer-readable medium 110 can be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). For example, the computer-readable medium 110 can include one or more wide area networks (WANs), metropolitan area networks (MANs), campus area networks (CANs), or local area networks (LANs); theoretically, the computer-readable medium 110 could be a network of any size or characterized in some other fashion. Networks can include enterprise private networks and virtual private networks (collectively, "private networks"). As the name suggests, private networks are under the control of a single entity. Private networks can include a head office and optional regional offices (collectively, "offices"). Many offices enable remote users to connect to the private network offices via some other network, such as the Internet. The example of FIG. 1 is intended to illustrate a computer-readable medium 110 that may or may not include more than one private network.

As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Through the arrangement of the system 100, the content editor client 106 can leverage the computing resources and power of the theme-based effects content editor server 102 when creating or modifying elements of foundational content, especially using a theme comprising one or more theme-based effects. Often, the theme-based effects content editor server 102 comprises computing resources that surpass those of the content editor client 106, or computing resources that are better suited for content creation or modification than those of the content editor client 106. Though FIG. 1 depicts a single content editor client, the system 100 can include multiple content editor clients that can communicate with the theme-based effects content editor server 102.

"Foundational content" includes multimedia-based content, whether audio, visual, or audio-visual, that a user enhances using a theme as described in this paper. The multimedia-based content may be authored or otherwise produced by a user using the content creation/editing tool. Foundational content can include content initially based on/started from a vendor-provided or user-provided content. For example, user-provide content used as foundational content can be sourced from a user's personal datastore, such as a memory device coupled to the user's personal computer or integrated in the user's smartphone or camera. Examples of user-provided content (possibly sourced from a personal datastore) can include video recordings of such personal events as weddings, birthday parties, anniversary parties, family vacations, graduations, and those relating to family events (e.g., a child's first steps, a family picnic, a child's recital). In some instances, the foundational content is generated, by a user, using a selection of content segments sourced from user-provided content and/or vendor-provide content. Accordingly, the foundational content can comprise a composition of content portion originating from multiple sources. Accordingly, an example foundational content can comprise a sequence of video clips provided by a user. The foundational content may or may not be one composed by the user to tell a particular story, often one relating to a particular event or occasion (e.g., tells of a personal accomplishment or journey).

The foundational content can be created to be multi-layered content, comprising multiple content layers of different content types include, for example, audio, video, still images/graphics, animation, transition, or other content generated by a content generator. A content generator is typically an individual, but can also be a group, a business entity, or other entity, that creates content using a device like a camera, a video camera, an electronic device (such as a mobile phone or other electronic device), or other device. In some embodiments, the content generator's device can comprise an electronic scanner used to capture a painting or drawing. The content generator's device can also include an electronic device that captures content using an input device (e.g., a computer that captures a user's gestures with a mouse or touch screen). High definition/quality content as used herein includes content having definition or quality that is higher than the average definition or quality for the similar content. For example, high definition/quality audio content can include audio clips having a high sampling rate (e.g., 44 KHz), has a higher bit-rate or effective bit-rate (e.g., 256 Kbs), or is encoded in a lossless audio encoding format.

As used herein, a "theme" can comprise one or more layers of theme-based effects, which may be audio or visual in nature and facilitate the overall effect of the theme on the content being created or modified. Example layers can include soundtrack layers, sound effect layers, animated visual layers, static visual layers, color adjustment layers, and filter layers. Example theme-based effects included in the theme can include visual overlays (e.g., animated or static images/graphics), text-based overlays (e.g., captions, titles, and lower thirds), transitions (e.g., visual or audio transitions between content portions), audio overlays (e.g., soundtracks and sound effects), and the like. Example themes can include those relating to fashion (e.g., fashionista theme), traveling (e.g., journeys or vacations), time eras (e.g., vintage theme or disco theme), events (e.g., party-related themes), genres of book, music or movies (e.g., punk rock music or black noir movies), and the like. Generally, themes comprise a pre-defined set of theme-based effects that relate to the theme, and are available for use through the system 100 for free or for based on a fee (e.g., fee per a theme, or fee-based subscription). The pre-defined themes may or may not be authored through the use of the system 100, and may or may not be authored by a third-party (e.g., another user of the system 100, or third-party service hired by the provider of the system 100). In certain instances, a theme can augment or enhance the ability of a foundational content to tell a particular story, often one relating to a particular event or occasion (e.g., tells of a personal accomplishment or journey).

In the example of FIG. 1, the system 100 can enable a user at the content editor client 106 to instruct the theme-based effects content editor server 102 to apply a theme to the foundational content, and to possibly create or modify foundational content, on behalf of the client 106. As noted, the foundational content can be multi-layered content comprising a plurality of content layers, where each content layer comprises one or more content items from a content library, and the content items are provided by a third-party vendor or the user of the content editor client 106. In various implementations, the user is presented with a selection of themes via the content editor client 106 and the user can select from that one or more themes for application to the foundational content. Depending on the implementation, a user can apply a given theme at the exclusion of others or in combination with other themes.

In some implementations, the theme selected by the user can be subject to one or more licensing parameters that can determine use of the theme. For example, licensing parameters associated with a theme can limit use of the theme in various ways including, for example, rights and permissions that limit use of the theme to specific types of foundational content, limit the number of times a theme can be used/applied, limit the quality of the theme based on certain conditions (e.g., whether a payment has been made), limit use of one or more theme-based effects in association with the theme, limit use of the theme based on a cost, and the like.

The one or more licensing parameters can be stored at the theme-based effects content editor server 102, in association with the theme. Before the theme is applied to the foundational content, the licensing parameters can be retrieved for the theme and the theme can be applied to the foundational content in accordance with the retrieved licensing parameters. For some implementations, the licensing parameters can be retrieved upon user selection of the theme through the client 106. Where a cost is associated with use of theme, payment processing for use of the theme can be facilitated through the client 106 by a user providing payment information to the theme-based effects content editor server 102 through the content editor client 106 and/or the user providing payment authorization through the content editor client 106. The amount of payment or success in payment can control access to the theme, such as whether the theme can be used and/or whether the theme once applied to foundational content can be utilized in a rendered theme-based content product.

After a user-selected theme is applied to the foundational content, the resulting theme-based foundational content can be rendered to a rendered theme-based content product, which is be ready for consumption by others. Additionally, in some implementations, consumption (e.g., playback) of the theme-based foundational content may or may not be limited to the system 100, whereas the rendered theme-based content product is consumable by stand-alone media players external to the system 100.

To facilitate theme application and/or modification of the foundational content, the theme-based effects content editor server 102 can prepare a copy of a latest version of the foundational content for the content editor client 106 to preview, to apply a theme, and/or modify content elements. Once prepared by the theme-based effects content editor server 102, the copy of the latest version of the foundational content can be maintained by and stored at the theme-based effects content editor server 102 (e.g., on the server-side datastore 104) on behalf of the content editor client 106. Then, when the content editor client 106, for example, desires to apply a theme or a modification to the latest version of the foundational content, it does so using the copy of the latest version of the foundational content.

In some implementations where the copy of the latest version of the foundational content is maintained at the server 102 (e.g., on the server-side datastore 104), the client 106 can instruct the server 102 to perform the desired theme applications and/or modifications to the copy of the latest version of the foundational content and, subsequently, provide the a copy of the resulting foundational content. In some implementations where the copy of the latest version of the foundational content for the content editor client 106 is maintained at the client 106 (e.g., on the client-side datastore 108), the client 106 can directly modify the copy of the latest version of the foundational content and, subsequently, send the modifications applied to the copy of the latest version of the foundational content to the server 102 (which can update the latest version of the foundational content with the received modification).

With respect to some implementations, the application of a theme or modification to the foundational content by the content editor client 106 can include, in addition to content modification operations, such operations as: adjusting copyright use limitations on some or all of the foundational content, locking some or all portions of the foundational content such that some or all of the foundational content is prevented from being modified, adding watermarks to some or all of the foundational content, or tagging objects (e.g., people, places, or things) shown in the foundational content.

As the theme-based effects content editor server 102 applies themes, or creates/modifies the foundational content product, the server 102 can provide the content editor client 106 with an updated version of the foundational content product. The content editor client 106 can use the resulting foundational content product (which may or may not comprise proxy content items) for review or editing purposes as the client 106 continues to apply themes or modify the foundational content.

As the theme-based effects content editor server 102 applies themes, or creates/modifies the foundational content product (e.g., in accordance with instructions received from content editor client 106), the server 102 can store one or more versions of the foundational content on the server-side datastore 104. When the content editor client 106 receives a new or updated version of the foundational content, the client 106 can store these on the client-side datastore 108 before the client 106 directly applies a theme or modifies the new/updated foundational content.

Those skilled in the art will appreciate that for various embodiments, when a theme application, content modification, or content update is transferred between the theme-based effects content editor server 102 and the content editor client 106, such application, modification or update can comprise a list of modification instructions (e.g., including layer identification information, timeline information, content identification information), a copy of the modified content in its entirety, or a copy of the content portions that are modified/updated.

In the example of FIG. 1, the theme-based effects content editor server 102 and/or the content editor client 106 can include an operating system. An operating system is a set of programs that manage computer hardware resources, and provides common services for application software. The operating system enables an application to run on a computer, whereas only applications that are self-booting can generally run on a computer that does not have an operating system. Operating systems are found in almost any device that includes a computer (e.g., cellular phones, video game consoles, web servers, etc.). Examples of popular modern operating systems are Linux, Android®, iOS®, Mac OS X®, and Microsoft Windows®. Embedded operating systems are designed to operate on small machines like PDAs with less autonomy (Windows® CE and Minix 3 are some examples of embedded operating systems). Operating systems can be distributed, which makes a group of independent computers act in some respects like a single computer. Operating systems often include a kernel, which controls low-level processes that most users cannot see (e.g., how memory is read and written, the order in which processes are executed, how information is received and sent by I/O devices, and devices how to interpret information received from networks). Operating systems often include a user interface that interacts with a user directly to enable control and use of programs. The user interface can be graphical with icons and a desktop or textual with a command line. Application programming interfaces (APIs) provide services and code libraries. Which features are considered part of the operating system is defined differently in various operating systems, but all of the components are treated as part of the operating system in this paper for illustrative convenience.

In the example of FIG. 1, the theme-based effects content editor server 102 and/or the content editor client 106 can include one or more datastores that hold content, themes, and/or other data. A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

Various components described herein, such as those of the system 100 (e.g., the theme-based effects content editor server 102 or the content editor client 106) can include one or more engines, which can facilitate the application of themes to foundational content (thereby generating a theme-based foundational content). As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the theme-based effects content editor server 102 and/or the content editor client 106 can include one or more computers, each of which can, in general, have an operating system and include datastores and engines. Accordingly, those skilled in the art will appreciate that in some implementations, the system 100 can be implemented as software (e.g., a standalone application) operating on a single computer system, or can be implemented as software having various components (e.g., the theme-based effects content editor server 102 and the content editor client 106) implemented on two or more separate computer systems.

In this example, the server 102 and the client 106 can execute theme-based effects content editing services inside a host application (i.e., can execute a browser plug-in in a web browser). The browser plug-in can provide an interface such as a graphical user interface (GUI) for a user to access the content editing services on the theme-based effects content editor server 102. The browser plug-in can include a GUI to display themes, content and layers stored on the datastores of the theme-based effects content editor server 102 and/or the content editor client 106. For instance, the browser plug-in can have display capabilities like the capabilities provided by proprietary commercially available plug-ins like Adobe® Flash Player, QuickTime®, and Microsoft® Silverlight®. The browser plug-in can also include an interface to execute functionalities on the engines in the theme-based effects content editor server 102.

In the example of FIG. 1, the theme-based effects content editor server 102 and/or the content editor client 106 can be compatible with a cloud-based computing system. As used in this paper, a cloud-based computing system is a system that provides computing resources, software, and/or information to client devices by maintaining centralized services and resources that the client devices can access over a communication interface, such as a network. The cloud-based computing system can involve a subscription for services or use a utility pricing model. Users can access the protocols of the cloud-based computing system through a web browser or other container application located on their client device.

In the example of FIG. 1, one or more of the engines in the theme-based effects content editor server 102 and/or the content editor client 106 can include cloud-based engines. A cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices. In the example of FIG. 1, one or more of the datastores in the multi-source journal content integration server 102 can be cloud-based datastores. A cloud-based datastore is a datastore compatible with a cloud-based computing system.

Figure 2:
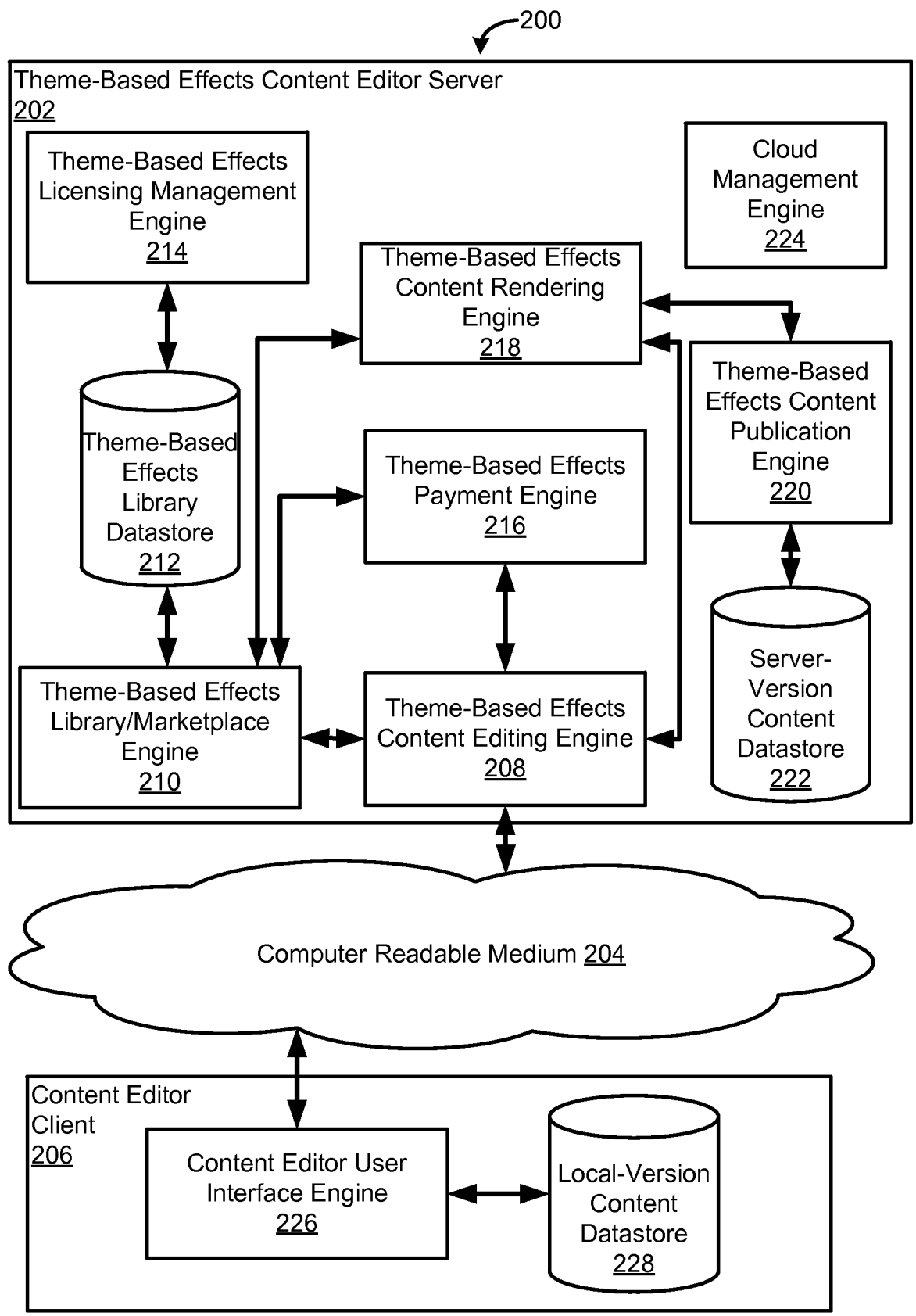
FIG. 2 depicts a diagram of an example of a system for theme-based effects content editing in accordance with some implementations.

FIG. 2 depicts a diagram of an example of a system 200 for theme-based effects content editing in accordance with some implementations. In the example of FIG. 2, the system 200 can include a theme-based effects content editor server 202, a content editor client 206, a computer-readable medium 204 coupled between the theme-based effects content editor server 202 and the content editor client 206. For some implementations, the computer-readable medium 204 can be a network, which can facilitate data communication between the theme-based effects content editor server 202 and the content editor client 206.

In the example of FIG. 2, the theme-based effects content editor server 202 can include a theme-based effects content editing engine 208, a theme-based effects library/marketplace engine 210, a theme-based effects library datastore 212, a theme-based effects licensing management engine 214, a theme-based effects payment engine 216, a theme-based effects content rendering engine 218, a theme-based effects content publication engine 220, a server-version content datastore 222, and a cloud management engine 224. The content editor client 206 can include a content editor user interface engine 226 and a local-version content datastore 228 coupled to the content editor user interface engine 226.

In the example of FIG. 2, the theme-based effects content editing engine 208 can be coupled to the theme-based effects library/marketplace engine 210, coupled to the theme-based effects content rendering engine 218, and through the computer-readable medium 204, coupled to the content editor user interface engine 226. The theme-based effects library/marketplace engine 210 can be coupled to the theme-based effects library datastore 212, coupled to the theme-based effects payment engine 216, coupled to the theme-based effects content rendering engine 218, and the theme-based effects content editing engine 208. The theme-based effects library datastore 212 can be coupled to the theme-based effects library/marketplace engine 210, and coupled to the theme-based effects licensing management engine 214. The theme-based effects payment engine 216 can be coupled to the theme-based effects content editing engine 208, and coupled to the theme-based effects library/marketplace engine 210. The theme-based effects content rendering engine 218 can be coupled to the theme-based effects content editing engine 208, coupled to the theme-based effects library/marketplace engine 210, and coupled to the theme-based effects content publication engine 220. The theme-based effects content publication engine 220 can be coupled to the theme-based effects content rendering engine 218, and coupled to the server-version content Datastore 222.

In the example of FIG. 2, the theme-based effects content editing engine 208 can execute instructions regarding applying themes to or modifying aspects of foundational content a user (e.g., at the content editor client 206) intends to enhance or modify. For some implementations, the theme-based effects content editing engine 208 can apply themes and modify the foundational content by utilizing the functionality various engines included in the theme-based effects content editor server 202, such as the theme-based effects library/marketplace engine 210 and the theme-based effects content rendering engine 218. In addition, for some implementations, the theme-based effects content editing engine 208 can apply themes and modify the foundational content on behalf of, and in accordance with instructions received from, the content editor client 206.

For example, in certain implementations, the theme-based effects content editing engine 208 can establish a data connection with the content editor client 206 through the computer-readable medium 204 (e.g., a network), can receive commands relating to theme application, content creation or content modification over the data connection (e.g., network connection), can perform theme application, content creation or content modification operations in accordance with commands received from the content editor client 206, and can transmit to the content editor client 206 a version of the foundational content that results from the operations (e.g., a theme-based foundational content). Depending on the implementation, the commands (relating to theme application, content creation or content modification) may or may not be generated by the content editor user interface engine 226 residing at the content editor client 206. For some implementations, the content editor user interface engine 226 can generate commands as a user at the content editor client 206 interacts with a user interface presented by the content editor user interface engine 226.

During application of a theme and/or a theme-based effect (which may be associated with a theme), the theme-based effects content editing engine 208 can adapt one or more timelines associated with the theme and/or the theme-based effect (herein, also referred to as "effect timelines") relative to the one or more timelines associated with the foundational content (herein, also referred to as "content timelines") that is to be enhanced by the theme/theme-based effects. Often, an effect timeline associated with a theme or theme-based effect is adapted relative to temporal elements present in a content timeline associated with the foundational content. Temporal elements to which an effect timeline can be adapted include, for example, a set of cues associated with the content timeline. A cue associated with a timeline can indicate state or stop of a portion of content (e.g., music clip or video transition) in the foundational content, possibly with respect to a particular layer of the foundational content (e.g., audio layer or bottom-most video layer); can associate a timestamp on the timeline with specific metadata; or can serve as a trigger for an action performed by an applied theme and/or theme-based effect (e.g., trigger start or stop of a video overlay, trigger change in text overlay, or trigger change in soundtrack applied by the theme and/or theme-based effect).

In adapting an effect timeline of a theme and/or theme-based effect, the theme-based effects content editing engine 208 can adjust the effect timeline to align with one or more cues of a content timeline associated with the foundational content. Consider, for instance, where a theme-based animation effect comprises a layer in which a visual object traverses across the layer between a start cue and a stop cue on an effect timeline associated with the theme-based animation effect. When this example theme-based animation effect is applied to a given portion of foundational content, the start and stop cues on the effect timeline can be adjusted according to (e.g., aligned with) cues on the content timeline associated with the given content portion. In doing so, a theme and/or theme-based effect can be applied to the given portion of the foundational content while preserving the content timeline associated with the foundational content.

To illustrate, suppose that the foundational content a user intends to enhance through system 200, with a theme and/or a theme-based effect, comprises a set of video clips relating to a personal event, such as a birthday party. Further suppose that the user intends to apply a birthday party-related theme to the foundational content (e.g., animation displaying flying confetti) and that the video clips included in the foundational content are sequence according to a set of cues associated with a content timeline associated with the foundational content. When applying the birthday party-related theme to the foundational content, various implementation can avoid adapting the content timeline of the foundational content (e.g., adjusting the duration of one or more video clips included in the foundational content, or adjusting the overall duration of the foundational content) according to (e.g. to align with) the effect timeline (e.g., the duration) of the animation of the birthday party-related theme. Rather, such implementations can adapt the effect timeline of the animation of the birthday party-related theme according to (e.g., to align with) the content timeline of the foundational content. In doing so, various implementations can apply the birthday party-related themes to foundational content without compressing, extending, or cutting short the duration of the foundational content or any portion of content included therein.

In certain implementations, once a theme and/or a theme-based effect is selected for application, the theme-based effects content editing engine 208 can directly apply the selected theme and/or the selected theme-based effect to the foundational content, or employ the use of the theme-based effects content rendering engine 218 to apply the selected theme and/or the selected theme-based effect to the foundational content. In some implementations where the theme-based effects content editing engine 208 directly applies the selected theme and/or the selected theme-based effect to the foundational content, the theme-based effects content rendering engine 218 can generate the rendered theme-based content product from the foundational content as provided by the theme-based effects content editing engine 208. Alternatively, in various implementations where the theme-based effects content rendering engine 218 can apply the selected theme and/or the selected theme-based effect to the foundational content on behalf of the theme-based effects content editing engine 208 and then provide the theme-based foundational content that results to the theme-based effects content editing engine 208.

To converse on processing time, processing resources, bandwidth, and the like, the theme-based effects content editing engine 208 in certain implementations may or may not utilize lower quality content (e.g., non-high definition video) or theme-based effects when applying themes, creating content, and/or modifying content with respect to foundational content. The lower quality foundational content that results from use of such lower quality items can be useful for preview purposes, particularly when the foundational content is being actively edited. Eventually, the theme-based effects content rendering engine 218 can generate a higher quality version of the foundational content (i.e., the rendered theme-based content product) when a user has concluded previewing and/or editing the foundational content.

For various implementations, once an initial theme and/or theme-based effect is applied to the foundational content (to result in an initial theme-based foundational content), an alternative theme and/or theme-based effect can be applied in place of, or in addition to, the initial theme and/or theme-based effect, thereby resulting in an alternative version of the theme-based foundational content.

In some implementations, the theme-based effects content editing engine 208 can apply a selected theme to foundational content according to one or more licensing parameters associated with the selected theme, where the licensing parameters define rights and permissions of use for the selected theme. For example, the one or more licensing parameters associated with a theme can comprise a limitation and/or a cost associated with use of the theme. As noted herein, theme that can be selected for application can include those created by one or more user of the system 200 and/or third-party vendors. Depending on the implementation, the author of a given theme and/or operator of the system 200 can define licensing parameters for the themes available for use through the system 200. In certain implementations, the licensing parameter(s) for a theme can determine and/or limit the licensing parameter(s) of the theme-based foundational content that results from application of the theme on foundational content. Use limitations of a theme as defined by a licensing parameter can include those relating to quality of the theme (e.g., high definition or lower definition theme-based effects), subject matter of foundational content to be enhanced by the theme, publication options for the theme-based foundational content, media format of the theme-based foundational content, and the like. Licensing parameters for a given theme can be provided to the theme-based effects content editing engine 208 directly by way of the theme-based effects library/marketplace engine 210, the theme-based effects library datastore 212, and/or the theme-based effects licensing management engine 214.

In the example of FIG. 2, the theme-based effects payment engine 216 can facilitate user payment to the system 200, and can determine the level of functionality provided by the theme-based effects content editor server 202, or the level of definition/quality for theme-based effects in themes applied to foundational content. For instance, once payment has been received by the theme-based effects payment engine 216 and the theme-based effects payment engine 216 has informed the theme-based effects content editing engine 208 of such payment, the theme-based effects content editing engine 208 can allow the user to access certain themes in the theme-based effects library datastore 212 (e.g., for-purchase content), can allow the user to perform certain content creation, content modification, and/or theme-related operations (e.g., splitting a content layer), or can allow the user to publish the theme-based foundational content with high definition/quality theme-based effects. In some embodiments, the definition/quality of the theme-based effects within the foundational content can be variable and determined based on the amount payment made by the user. The theme-based effects payment engine 216 can maintain an account, the balance from which funds are deducted as payments to the theme-based effects content editor server 202 or to which charges are incurred allowing a user to submit payment later (e.g., a credit system). In various embodiments, the theme-based effects content editing engine 208 can inform the theme-based effects payment engine 216 of the costs accrued by the user as he or she uses themes/theme-based effects from the theme-based effects library datastore 212 in the foundational content, or as certain functionality of the theme-based effects content editing engine 208 is utilized. As described herein, the pricing for content items can be stored with the content items in the theme-based effects library datastore 212.

The theme-based effects content editing engine 208 can receive pre-payment or post-payment through the theme-based effects payment engine 216 to permit access to for-purchase themes, to determine rendering options when generating a rendered theme-based content product from the theme-based foundational content, and/or to permit publication of the theme-based foundational content. The system 200 can utilize certain payment parameters or conditions, such as amount of payment, success of payment processing, or type of payment, in determining (e.g., limiting) use of select themes. In some implementations, use of a theme based on payment parameters and conditions can be defined at least in part by licensing parameters associated with the theme. More regarding is licensing parameters is discussed with respect to the theme-based effects licensing management engine 214.

In the example of FIG. 2, the theme-based effects library/marketplace engine 210 can is coupled to the theme-based effects library datastore 212 and manages themes and/or the theme-based effects stored therein. As discussed herein, a "theme" can comprise one or more layers of theme-based effects, which may be audio or visual in nature and facilitate the overall effect of the theme on the content being created or modified. Accordingly, for some implementations, the theme-based effects managed according to the themes to which they are associated, where a given theme-based effect may or may not be associated with more than one theme. Additionally, for some implementations, the theme-based effects library/marketplace engine 210 can be responsible for adding, deleting and modifying themes and/or the theme-based effects stored on the theme-based effects library datastore 212, for retrieving a listing of content items stored on the theme-based effects library datastore 212, for providing details regarding themes and/or theme-based effects stored on the theme-based effects library datastore 212, and for providing to other engines themes and/or theme-based effects from the theme-based effects library. For example, the theme-based effects library/marketplace engine 210 can provide themes and/or theme-based effects to the theme-based effects content editing engine 208 as a user reviews or selects a theme and/or theme-based effect to be added to the foundational content that the user intends to enhance. In another example, the theme-based effects library/marketplace engine 210 can provide themes and/or theme-based effects to the theme-based effects content rendering engine 218 as the engine 218 renders one or more layers of the foundational content (e.g., a theme has been applied) to generate a rendered theme-based content product (which may be ready for consumption by others).

In various implementations, the theme-based effects library/marketplace engine 210 can function as a marketplace through which themes can be browsed, purchased, or exchanged. The themes available through the theme-based effects library/marketplace engine 210 can include those made available for free, those available for purchase, those created by users of system 200, or created by third-party vendors. The theme-based effects library/marketplace engine 210 can further enable a user of the system 200 to share and/or exchange user-created themes with other users.

In the example of FIG. 2, the theme-based effects library datastore 212 can store one or more themes and/or theme-based effects relating to themes. As discussed herein, theme-based effects can comprise an audio or visual effect configured to overlay the foundational content. For some implementations, the theme-based effect can comprise an audio or visual effect triggered according to at least one cue in the set of cues associated with the content timeline. Depending on the implementation, the theme-based effect can comprise an animation layer, a static layer, a title, a transition, a lower third, a caption, a color correction layer, or a filter layer.

In some instances, the theme-based effect can comprise a piece of multimedia content (e.g., audio, video, or animation clip), which may or not be in a standard multimedia format. For example, a theme-based audio effect can be embodied in such audio file formats as WAV, AIFF, AU, PCM, MPEG (e.g., MP3), AAC, WMA, and the like. In another example, a theme-based video effect can be embodied in such video file formats as AVI, MOV, WMV, MPEG (e.g., MP4), OGG, and the like. In a further example, a theme-based image effect can be embodied in such image file formats as BMP, PNG, JPG, TIFF, and the like, or embodied in such vector-based file formats as Adobe® Flash, Adobe® Illustrator, and the like. Those skilled in the art will appreciate that other theme-based audio, video, or image effects can be embodied in other multimedia file formats that may or may not be applied to the foundational content as an overlay layer. When a theme-based effect is stored on the theme-based effects library datastore 212, theme-based effects can be stored in their native multimedia file formats or, alternatively, converted to another multimedia format (e.g., to an audio and/or video file format common across datastore 212). In operation, the theme-based effects library datastore 212 can store a given theme by storing associations between the given theme and one or more theme-based effects stored on the theme-based effects library datastore 212 that facilitate the given theme's style on target content.

In the example of FIG. 2, the theme-based effects licensing management engine 214 can determine the licensing parameters (e.g., rights and permissions) of a theme, particularly those stored on the theme-based effects library datastore 212. The theme-based effects licensing management engine 214 can also inform the theme-based effects content editing engine 208 of such parameters. The theme-based effects content editing engine 208, in turn, can adapt or control its own functionality in accordance with the licensing rights and permissions of the theme as the theme is applied to foundational content.

For example, where the theme licensing rights and permissions of a certain theme restricts the theme from being used with foundational content to be published on YouTube®, the theme-based effects content editing engine 208 can automatically disable a publication options relating to YouTube®. Other content licensing rights and permissions can include publication limitations on the theme-based foundational content that results after application of the theme, or limitations on use of themes based on the content existing in the foundational content. The theme-based effects licensing management engine 214 can inform the theme-based effects content editing engine 208 of the cost of the theme or certain theme-based effects associated therewith based on their use in accordance with the licensing rights and permissions. For certain implementations, the authors of the theme can configure the licensing rights and permissions for their theme, which can then be stored on the theme-based effects library datastore 212 and retrieved by the theme-based effects licensing management engine 214.

In the example of FIG. 2, the theme-based effects content rendering engine 218 can render one or more layers of the foundational content, using a selected theme and/or a theme-based effect provided by the theme-based effects library/marketplace engine 210 (from the theme-based effects library datastore 212), after the selected theme and/or theme-based effect is applied to the foundational content by the theme-based effects content editing engine 208. As a result of rendering operation(s), the theme-based effects content rendering engine 218 can generate a rendered theme-based content product that is consumable by other users (e.g., via a stand-alone media player).

For example, the theme-based effects content rendering engine 218 can generate the rendered theme-based content product to be in a media data format (e.g., QuickTime® movie [MOV], Windows® Media Video [WMV], or Audio Video Interleaved [AVI])) compatible with a standards-based media players and/or compatible with a streaming media service (e.g., YouTube®). As the theme-based effects content rendering engine 218 renders layers of the foundational content to generate the rendered theme-based content product, the theme-based effects content editing engine 208 can provide the theme-based effects content rendering engine 218 with information specifying the theme and/or theme-based effect(s) presently applied to the foundational content, how one or more timelines associated with the theme and/or theme-based effect have been adapted (so that the theme and/or theme-based effect can be applied the foundational content during rendering while aspects of the associated content timeline are preserved), the desired quality (e.g., 480p, 780p, or 1080p video) or version for the resulting layers, and/or the desired media format of the rendered theme-based content product. As described herein, licensing parameters associated with the theme applied to the foundational content can determine rendering options (e.g., limitations) with respect to the theme-based foundational content.

Once generated, the theme-based effects content rendering engine 218 can provide the rendered theme-based content product that results to the theme-based effects content publication engine 220. In the example of FIG. 2, the theme-based effects content publication engine 220 can receive a rendered theme-based content product from the theme-based effects content rendering engine 218 and publishes the rendered theme-based content product for consumption by the others. For example, the rendered theme-based content product can be published such that the rendered theme-based content product can be downloaded and saved by the user or others as a stand-alone content file (e.g., MPEG or AVI file), or such that rendered theme-based content product can be shared to other over the network (e.g., posted to a website, such as YouTube® so that others can play/view the rendered theme-based content product).

As described herein, one or more licensing parameters associated with a theme utilized in the rendered theme-based content product can determine publication options (e.g., limitations) with respect to the rendered theme-based content product.

Once published, the rendered theme-based content product can be stored on the server-version content datastore 222. For some implementations, the published rendered theme-based content product can be added to a content library datastore (not shown) for reuse in other content products. Depending on the implementation, the published rendered theme-based content product can be added to a content library datastore as for-purchase content (for instance, via a content library/market place engine, with the sales proceeds being split between amongst the user and the content editor service provider), or added to the content library datastore as free content available to the public. The user can also define content usage parameters (i.e., licensing rights) for their rendered theme-based content product when the rendered theme-based content product is added to a content library datastore.

In the example of FIG. 2, the content editor client 206 can comprise the content editor user interface engine 226 and a local-version content datastore 228 coupled to the content editor user interface engine 226. The content editor user interface engine 226 can facilitate theme application, content creation, or content modification of foundational content at the theme-based effects content editor server 202 by the content editor client 206. As noted herein, the content editor user interface engine 226 can establish a connection with the theme-based effects content editing engine 208 through the computer-readable medium 204, and then issue theme application, content creation, or content modification commands to the theme-based effects content editing engine 208. In accordance with the issued commands, the theme-based effects content editing engine 208 can perform the theme application, content creation, or content modification operations at the theme-based effects content editing engine 208, and can return to the content editor user interface engine 226 a version of the resulting foundational content (e.g., the theme-based foundational content).

Alternatively, the content editor client 206 can apply a theme and modify content by receiving a copy of the latest version of the foundational content as stored at the theme-based effects content editor server 202, applying the theme to or modifying the received copy, and then uploading the theme-applied/modified copy to the theme-based effects content editor server 202 so that the theme application and/or modifications can be applied to the last version of the foundational content stored at the theme-based effects content editor server 202. When the theme-applied/modified copy is uploaded from the content editor client 206 to the theme-based effects content editor server 202 to facilitate theme application and/or content modification of the foundational content, various implementations can utilize one or more methods for optimizing the network bandwidth usage.

In some embodiments, where the theme-based effects content editor server 202 is implemented using virtual or cloud-based computing resources, such virtual or cloud-based computer resources can be managed through the cloud management engine 224. The cloud management engine 224 can delegate various content-related operations and sub-operations of the server 202 to virtual or cloud-based computer resources, and manage the execution of the operations. Depending on the embodiment, the cloud management engine 224 can facilitate management of the virtual or cloud-based computer resources through an application program interface (API) that provides management access and control to the virtual or cloud-based infrastructure providing the computing resources for the theme-based effects content editor server 202.

Figure 3:
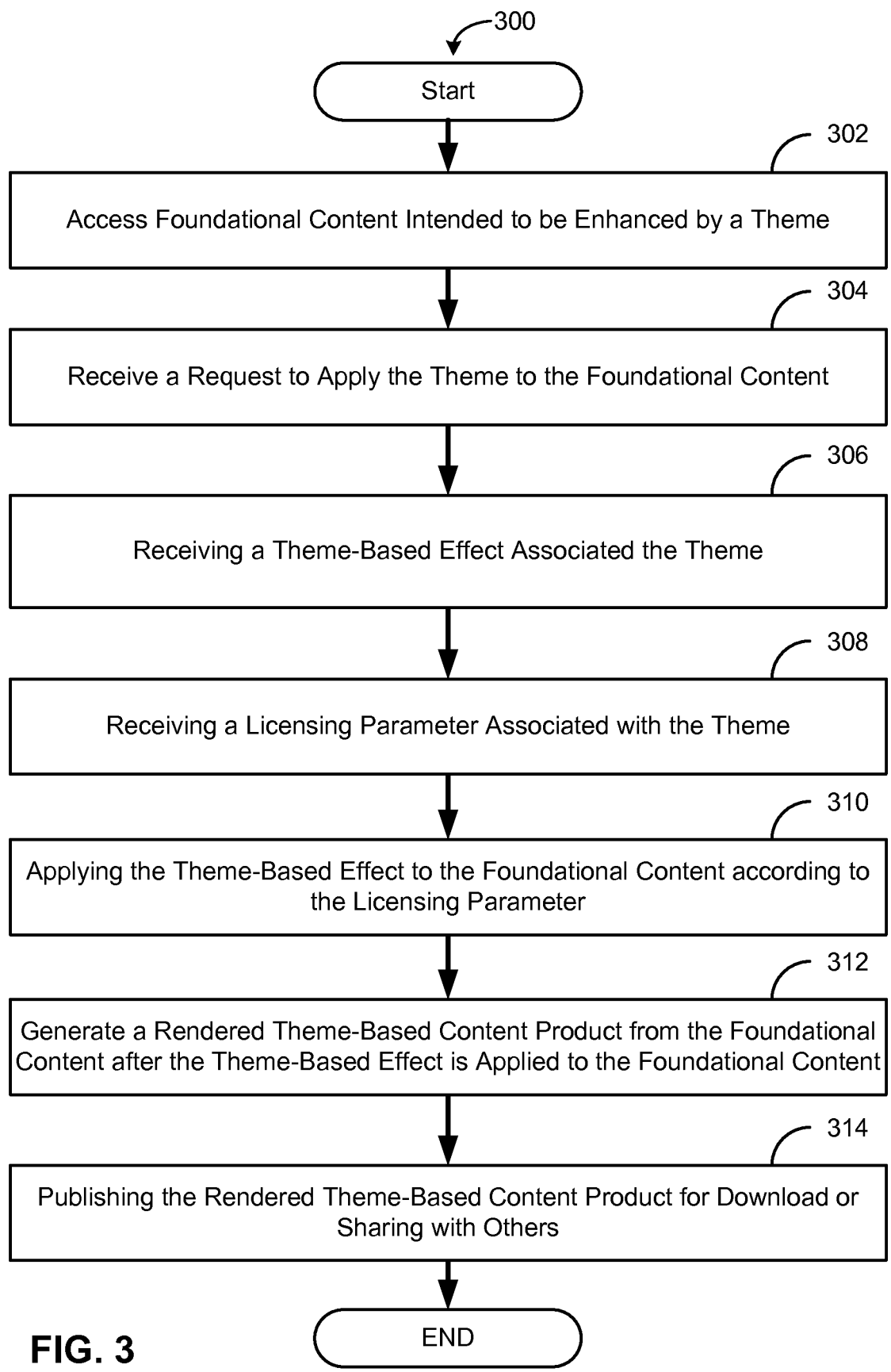
FIG. 3 depicts a flowchart of an example of a method for theme-based effects content editing in accordance with some implementations.

FIG. 3 depicts a flowchart 300 of an example of a method for theme-based effects content editing in accordance with some implementations. Those skilled in the art will appreciate that in some implementations, the modules of the flowchart 300, and other flowcharts described in this paper, can be reordered to a permutation of the illustrated order of modules or reorganized for parallel execution. In the example of FIG. 3, the flowchart 300 can start at module 302 with accessing foundational content intended to be enhance by a theme. As described herein, the foundational content can be that which a user intends to apply a selected theme and/or theme-based effects associated therewith. For example, the foundational content can be provided by a user or by a third-party (e.g., vendor), who may or may not provide it for a cost. As also described herein, the foundational content can be associated with a content timeline, which can comprise information defining a layer of the foundational content, defining content within the layer, or defining a temporal property of content within the layer.

In the example of FIG. 3, the flowchart 300 can continue to module 304 with receiving a request to apply the theme to the foundational content. Subsequently, the flowchart 300 can continue to module 306 with receiving a theme-based effect associated with the theme to the foundational content (thereby resulting in theme-based foundational content). Like the foundational content, the theme-based effect can have an associated effect timeline, which may or may not comprise information defining a layer of the theme-based effect, defining one or more audio or visual effects within the layer, or defining a temporal property of the audio or visual effects within the layer. The flowchart 300 can continue to module 308 with receiving a licensing parameter associated with the theme. In some embodiments, the licensing parameters associated with the theme can define the rights and permission of use for the theme as it is applied to the foundational content.

Thereafter, the flowchart 300 can continue to module 310 with applying the theme-based effect associated with the theme to the foundational content, according to the licensing parameter(s). Depending on the embodiment, the licensing parameters can define the use limitations of the theme, and those use limitations can determine how a theme-based effected associated with the theme can be applied to foundational content. For example, as described herein, a licensing parameter can limit the number of times a particular theme can be used by an individual user without payment, or limit application of the theme to foundational content for a duration. For some implementations, applying the theme-based effect can comprise adapting the associated effect timeline according to the set of cues while preserving the associated content timeline.

The flowchart 300 can then continue to module 312 with generating a rendered theme-based content product from the foundational content after the theme-based effect is applied to the foundational content. As described herein, the rendered theme-based content product is consumable by another user (e.g., via a stand-alone media player). Further, the flowchart 300 can continue to module 312 with publishing the rendered theme-based content product for download or sharing with shares. For some implementations, the publication of the rendered theme-based content product can enable the rendered theme-based content product to be consumable by another user. As described herein, the licensing parameters can determine publication options for the rendered theme-based content product.

Figure 4:
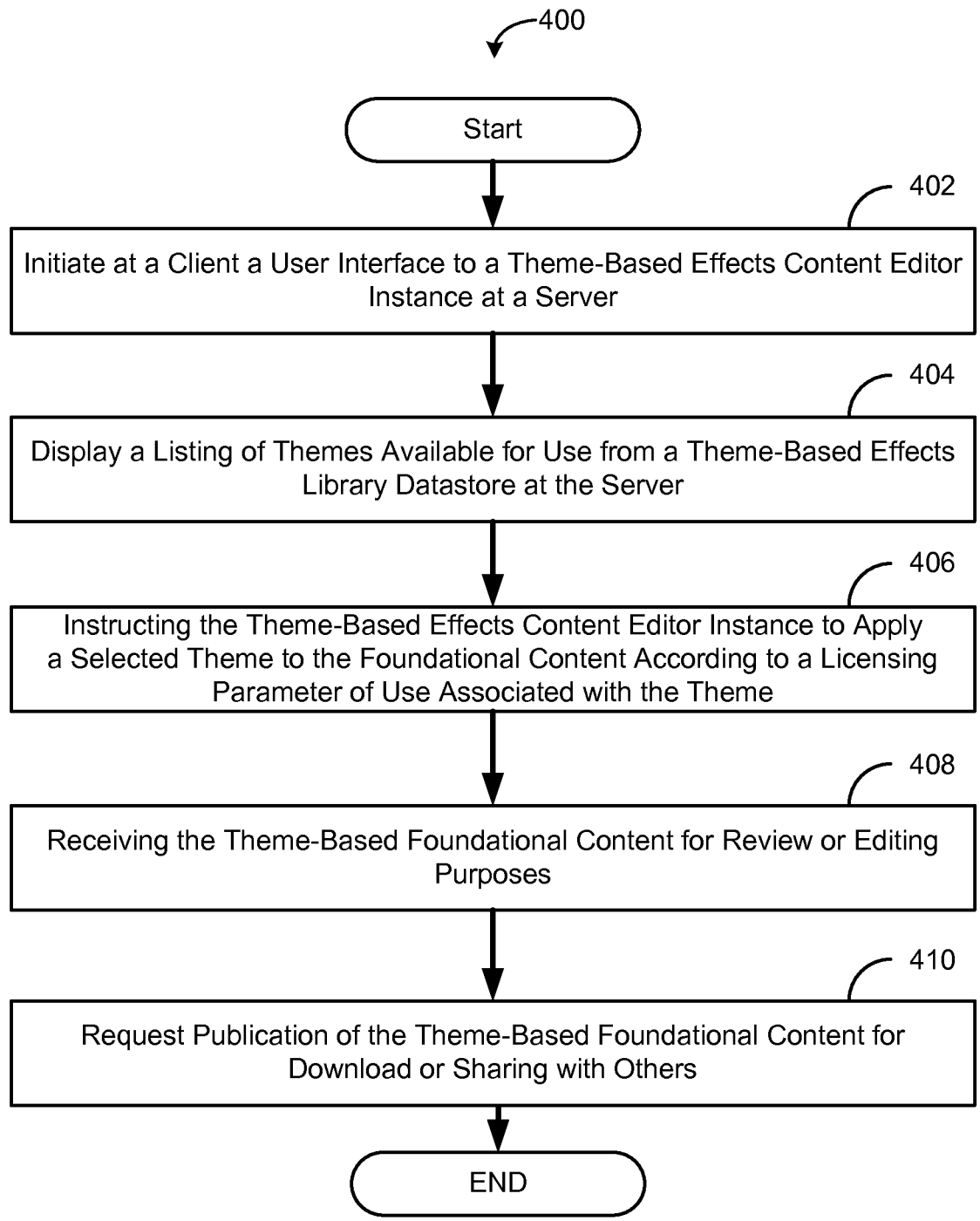
FIG. 4 depicts a flowchart of an example of a method for theme-based effects content editing in accordance with some implementations.

FIG. 4 depicts a flowchart of an example of a client-side method for low bandwidth consumption online content editing in accordance with some embodiments. In some implementations, the modules of the flowchart 400 and other flowcharts described in this paper are reordered to a permutation of the illustrated order of modules or reorganized for parallel execution. Those skilled in the art will appreciate that in some implementations, the modules of the flowchart 400, and other flowcharts described in this paper, can be reordered to a permutation of the illustrated order of modules or reorganized for parallel execution. In the example of FIG. 4, the flowchart 400 can start at module 402 with initiating a user interface at a client to a theme-based effects content editor instance at a server. Once initiated, a user at the client can issue commands, such as theme-related or content-related commands, to the theme-based effects content online content editor instance at the server through the user interface. In response, the theme-based effects content online content editor instance can perform operations on the multi-layered foundational content residing at the server, where the operations are in accordance with the theme-related or content-related commands issued. The client can be implemented by any known or convenient computing device including, for example, mobile computing devices, netbooks, and desktop. Generally, the server possesses computing resources in excess of those of the client, or the server possesses computing resources better suited for content creation or modification than those of the client.

In the example of FIG. 4, the flowchart 400 can continue to module 404 with displaying a listing of themes available for use in foundational content, where the theme is from a theme-based effects library datastore at the server. The server can query the theme-based effects library datastore themes, and the query result can be provided to the client through the user interface as a listing of the theme available for use. As noted herein, the themes listed can include themes that are free to be used during creation or modification operations on the foundational content, but that requires payment for the foundational content to be published or rendered at certain quality.

In the example of FIG. 4, the flowchart 400 can continue to module 406 with instructing the theme-based effects content online content editor instance at the server to apply a selected theme to the foundational content according to a licensing parameter associated with the theme. As noted herein, the licensing parameter can define the use limitations of the theme as it is applied, rendered, and/or published in connection with foundational content.

In the example of FIG. 4, the flowchart 400 can continue to module 408 with receiving a theme-based foundational content that results from module 406, which can be used at the client for review or editing purposes. Subsequently, the flowchart 400 can continue to module 410 with requesting the publication of the theme-based foundational content for the purposes of download or sharing with others. As described herein, the theme-based foundational content can first be rendered to a rendered theme-based content product to facilitate publication.

Figure 5:
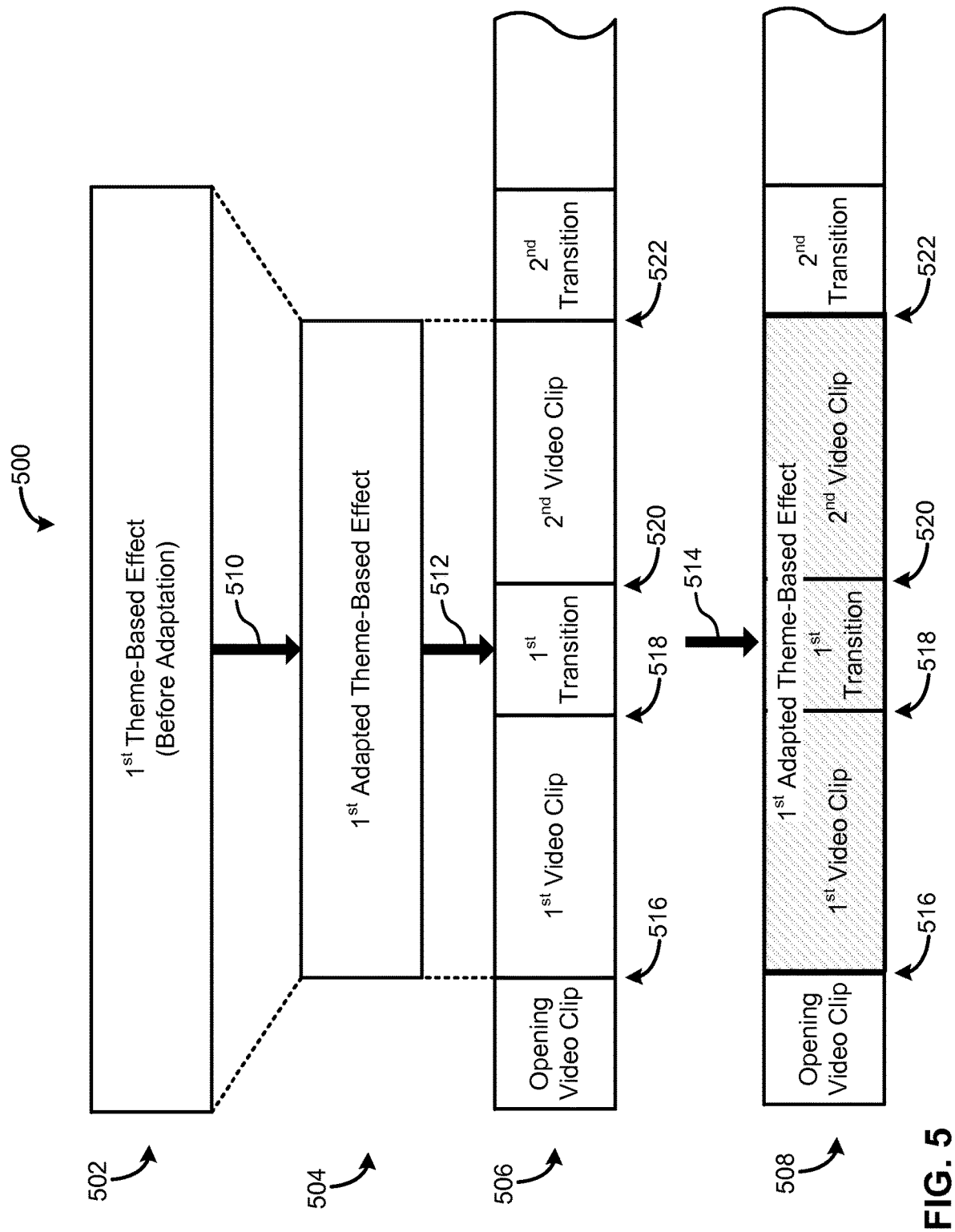
FIG. 5 depicts a diagram illustrating an example adaptation of an effect timeline in accordance with some implementations.

FIG. 5 depicts a diagram 500 illustrating an example adaptation of an effect timeline in accordance with some implementations. In particular, the example of FIG. 5 illustrates adaptation of an effect timeline 502, associated with a first theme-based effect, before the first theme-based effect is applied to a foundational content, represented by a content timeline 506. According to the content timeline 506 as shown, the foundational content can comprise an opening video clip at the start, a 1$^{st}$ video clip between cues 516 and 518, a first transition (e.g., video or audio transition) between cues 518 and 520, a second video clip between cues 520 and 522, a second transition, and possibly additional content portions. As also shown, during application of the first theme-based effect to the foundational content, the effect timeline 502 associated with the 1$^{st}$ theme-based effect can be adapted (310) to an adapted effect timeline 504 and then applied (312) to the foundational content associated with the content timeline 506.

Depending on the implementation, adaptation of the effect timeline 502 can include shortening or lengthening the overall duration of the effect timeline 502. For some implementations, the shortening of the duration of the effect timeline 502 can involve the compression one or more portions of the effect timeline 502 and/or removal of one or more portions of the effect timeline 502. Consequently, the adaptation of the effect timeline 502 to the adapted effect timeline 504 can determine the impact of the theme and/or theme-based effect on the foundational content, such as what effects are presented in the foundational content, how long effects of the theme and/or theme-based effect are presented in the foundational content, or how the effects are presented in the foundational content (e.g., speed of animation effect applied through the theme and/or the theme-based effect). Once the first theme-based effect is applied to the foundational content, the resulting theme-based foundational content may or may not be similar to that of content timeline 508.

Figure 6:
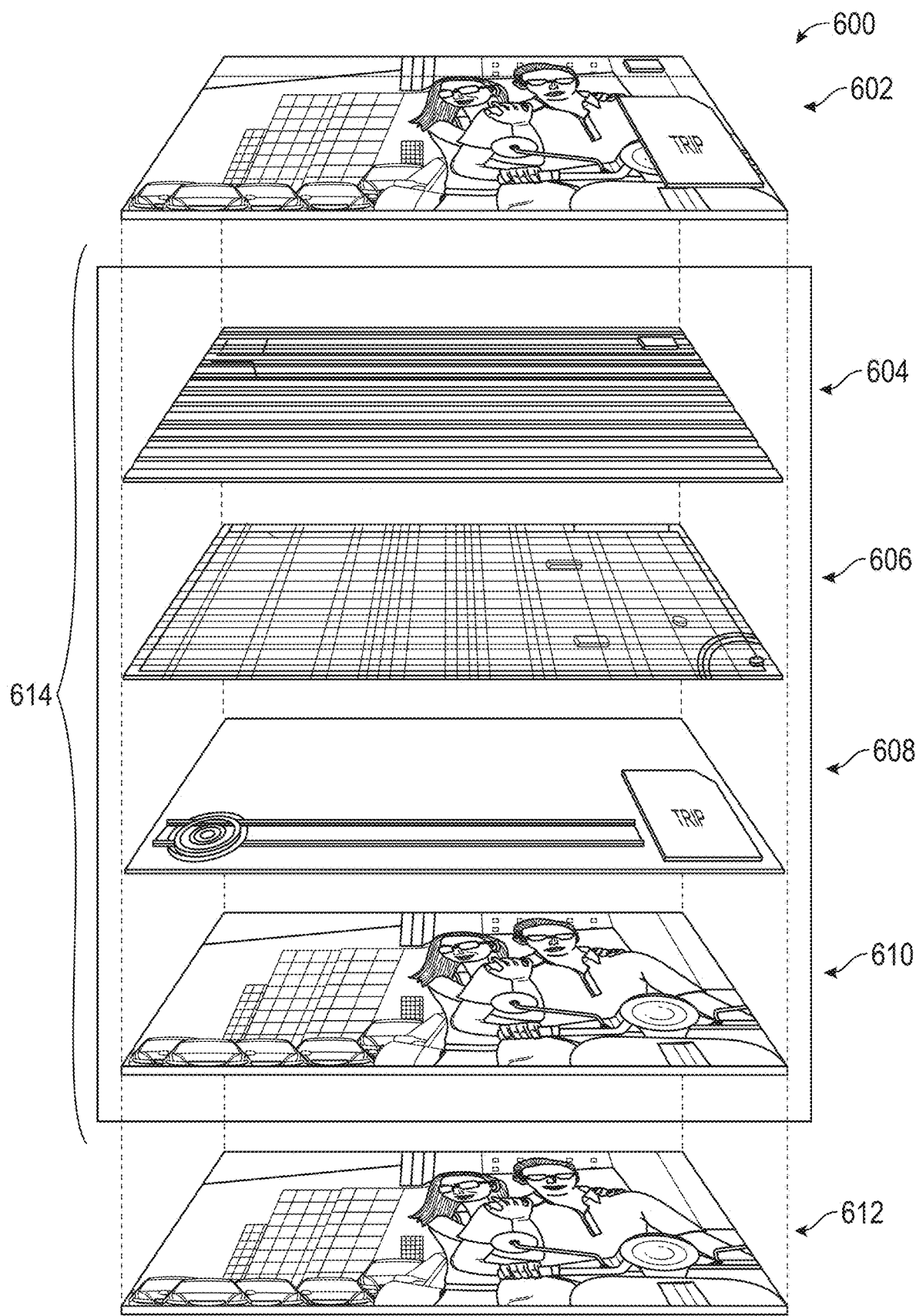
FIG. 6 depicts a diagram illustrating an example structure of a theme-based foundational content in accordance with some implementations.

FIG. 6 depicts a diagram 600 illustrating an example structure of a theme-based foundational content 602 in accordance with some implementations. In the example of FIG. 6, the theme-based foundational content 602 can result from applying a theme 614 to a foundational content 612. As described herein, the theme 614 can be applied to a foundational content by overlaying theme-based effects included therein over the foundational content 612. As shown, the theme 614 can comprise an image adjustment layer 610, a general layer 608 disposed over the image adjustment layer 610, an animation layer 606 disposed over the general layer 608, and a static layer 604 disposed over the animation layer 606. As noted herein, themes can comprise one or more theme-based effects, and such theme-based effects can be applied to foundational content by way of one or more layers. Accordingly, in some implementations, the image adjustment layer 610 can include color corrections, filters, and the like. The general layer 608 can include titles, transitions (e.g., audio or video), lower thirds, captions, and the like. The animation layer 606 can include vector-based animations and the like. The static layer 604 can include static images/graphics and the like. Those skilled in the art will appreciate that the structure of themes and/or theme-based effects applied to foundational content can differ between implementations.

Figure 7:
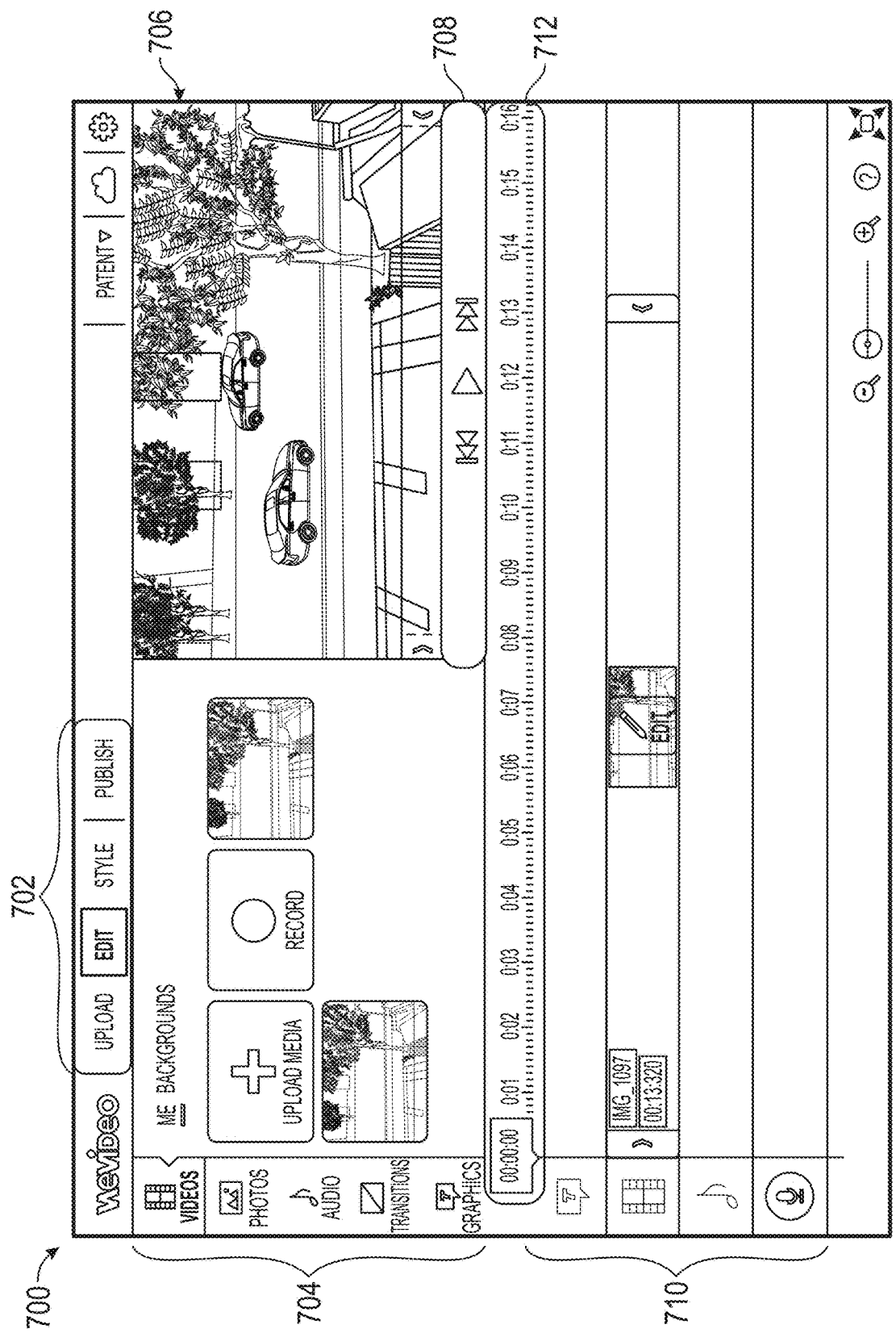
FIG. 7 depicts an example of a client-side user interface for theme-based effects content editing in accordance with some implementations.

FIG. 7 depicts an example of a client-side user interface 700 for theme-based effects content editing in accordance with some implementations. With respect to some implementations, the client-side user interface of FIG. 7 can control theme application, content creation, or content editing operations performed on foundational content. In particular, the client-side user interface 700 can control a theme-based content editing engine operating at a client, a theme-based effects content editing engine operating at a server, or both to facilitate the theme application, content creation and content editing operations on the foundational content. For some implementations As described herein, for various implementations, the client-side user interface 700 can cause various engines to operate such that foundational content is enhanced by the server using a theme and the theme-based foundational content is received by a client from the server. The client-side user interface 700 can also cause engines to operate such that a copy of the foundational content is enhanced or modified at the client using themes (e.g., a preview version is enhanced or modified at the client), and an enhanced/modified foundational content is uploaded to the server (e.g., for updating the latest version of the foundational content and/or final rendering of the foundational content into a rendered content product).

Additionally or alternatively, the client-side user interface 700 can cause various engines to operate such that the foundational content is prepared and stored at a server on behalf of the client, the client instructs the server to perform theme-enhancement/modification operations on the foundational content, and the client instructs the server (e.g., through the client-side user interface 700) to enhance/modify the foundational content the latest version of the foundational content at the server. The behavior and/or results of the client-side user interface 700 based on user input can be based on individual user preferences, administrative preferences, predetermined settings, or some combination thereof.

In some implementations, the client-side user interface 700 can be transferred from a server to a client as a module that can then be operated on the client. For instance, the client-side user interface 700 can comprise a client-side applet or script that is downloaded to the client from the server and then operated at the client (e.g., through a web browser). Additionally, the client-side user interface 700 can operate through a plug-in that is installed in a web browser. User input to the client-side user interface 700 can cause a command relating to online content editing, such as a content layer edit command or a content player/viewer command, to be performed at the client or to be transmitted from the client to the server.

The client-side user interface 700 can include multiple controls and other features that enable a user at a client to control the theme application, content creations, and content modification of foundational content. In the example of FIG. 7, the client-side user interface 700 includes a tabbed menu bar 702, a content listing 704, a content player/viewer 706, content player/viewer controls 708, a content layering interface 710, and a content timeline indicator 712.

As shown, the client-side user interface 700 can include the tabbed menu bar 702 that allows the user to select between: loading foundational content to a theme-based content editing system (for subsequent theme-based enhancement, content creation, or content modification); previewing and/or adding different content types (e.g., video, audio, or images/graphics available to them from a content library) to the foundational content, switching to content-creation/content-editing operations that can be performed on the foundational content; previewing and/or applying a theme to the foundational content. In the example of FIG. 7, the tabbed menu bar 702 presents a user with selecting between "Upload" (e.g., uploading personal content or themes), "Edit" (e.g., content editing mode, which presents the client-side user interface 700 as shown in FIG. 7), "Style" (e.g., applying styles to the foundational content through use of one or more themes), and "Publish" (e.g., publishing the latest version of the foundational content for consumption by others). The personal content can be that which the user uploaded to their account on the server, that which the user already created on the server, or both. Those of ordinary skill in the art would appreciate that in some embodiments, the tabbed menu bar 702 can include one or more selections that correspond to other functionalities of a theme-based content editing system.

In the example of FIG. 7, the content listing 704 can display a list of content available (e.g., from a content library) for use when editing the foundational. From the content listing 704, a user can add content to a new or existing content layer of the foundational content, possibly by "dragging-and-dropping" content items from the content listing 704 into the content layering interface 710. Examples of content types that can be the content listing 704 video, audio, images/graphics, transitions (e.g., audio or video), and the like. Depending on the implementation, transitions can include predefined (e.g., vendor provided) or user-created content transitions that can be inserted between two content items in a layer of the foundational content. For instance, with respect to video content (i.e., video clips), available transitions can include a left-to-right video transition which once inserted between a first video clip and a second video clip, can cause the first video clip transition to the second video clip in a left-to-right manner. Similarly, with respect to audio content (i.e., audio clips), available transitions can include a right-to-left transition which once inserted between a first audio clip and a second audio clip, can cause the first audio clip to fade into to the second audio clip starting from the right audio channel and ending at the left audio channel.

In some implementations, the content listing 704 can list the available content with a thumbnail image configured to provide the user with a preview of the content. For example, for a video content item, the thumbnail image may be a moving image that provides a brief preview of the video content item before it is added to the foundational content. With respect to an image content item, the thumbnail preview may be a smaller-sized version (i.e., lower resolution version) of the image content item. In certain implementations, a content item listed in content listing 706 can be further previewed in the content player/viewer 706, which may or may not be configured to play audio, play video, play animations, and/or display images (e.g., in a larger resolution than the thumbnail preview). The content listing 704 can also provide details regarding the listed content where applicable, including, for example, a source of the content, a date of creation for the content, a data size of the content, a time duration of the content, licensing information relating to the content item (where, and cost of using the content item.

In certain implementations, the user can graphically modify a temporal position or duration of a content layer or a content item within the content layer. For example, the user can "drag-and-drop" the graphically represented start or end of a content item (e.g., a cue) to adjust the duration of the content item (thereby the temporal start of temporal end of the content item) in the collaborative content product. According to various embodiments, when a temporal position, duration, or other temporal characteristic, associated with a content layer or a content item of the foundational item, is adjusted, corresponding adjustments can be automatically performed to any theme and/or theme-based effect that is presently applied to the foundational content. As such, for some implementations, content modification can be performed on the foundational content even after a theme and/or theme-based effect has been applied, while the impact of the theme and/or theme-based effect is maintained.

In the example of FIG. 7, a user can utilize the player/viewer 706 to preview content items (e.g., videos, photos, audio, transitions, or graphics) listed in the content listing 704 and available for use when creating or modifying content in the foundational content. The content player/viewer 706 can also provide a preview of the foundational content that is being enhanced, created or modified through the client-side user interface 700. Depending on the implementation, the version of the foundational content that can be previewed through the client-side user interface 700 can be the latest version stored at the server, at the client, or both.

In one example, the user can applying a theme to the foundational content that the user intends to enhance then preview the resulting theme-based foundational content through the content player/viewer 706. Depending on the embodiment, the content being previewed can be from a latest version of the foundational content residing at the server, a rendered version of the foundational content residing at the server, or a latest version of foundational content locally residing at the client. Where content being played or shown is provided from the server, such content can be streamed from the server to the client as the content is played or shown through the content player/viewer 706. In some embodiments, where content being played or shown is provided from the server, such content can be first downloaded to the client before it is played or shown through the content player/viewer 706.

In the example of FIG. 7, a user can control the operations of the content player/viewer 706 using the content player/viewer controls 708. The content player/viewer controls 708 can include control commands common to various players, such as previous track, next track, fast-backward, fast-forward, play, pause, and stop. In some implementations, a user input to the content player/viewer controls 708 can result in a content player/viewer command instruction being transmitted from the client to the server, and the server providing and/or streaming the content to the client to facilitate playback/viewing of selected content.

In the example of FIG. 7, the content layering interface 710 can enable a user to access and modify content layers of the foundational content. The content layering interface 710 can comprise a stack of content layer slots, where each content layer slot can graphically present all the content layers of a particular content type associated to the collaborative content product, or can present each content layer is a separate slot. Example content types include, without limitation, graphical content (e.g., "Graphics"), video content (e.g., "Video"), image content (e.g., "Image"), and audio content (e.g., "Audio"). Additionally, for particular implementations, when a theme and/or theme-based effect is applied to the foundational content, the applied theme and/or theme-based effect can be graphically presented in a separate layer slot in the content layering interface 710. The content layering interface 710 as shown in FIG. 7 comprises a content layer slot for graphical content, video content, soundtrack content, and audio recording content.

The content layering interface 710 can also comprise controls or features that enable the user to edit content layers of the foundational content. Through the content layering interface 710, a user can implement edits to a content layers, or content items thereof, particularly with respect to timelines and/or temporal elements associated with the content layer or content item (e.g., temporal position or duration of a content item). Generally, the content layering interface 710 can display timelines and/or temporal elements relating to a theme and/or theme-based effect once it has been applied to the foundational content. Temporal elements/cues, such as content starts, stops, and the like, can be represented in content layers as time markers. In some instances, a time marker for a given cue can be shown according to what the cue represents (e.g., temporal start, stop, or pause), the time value the cue represents, the timeline associated with the cue, or the theme and/or theme-based effect to which the cue is associated. Positioning of the time marker in the content layering interface 710 can be relative the content timeline indicator 712. For some implementations, adjustments to the cues can be facilitated (by a user) through use of time markers in the content layering interface 710 (e.g., "drag-and-drop" actions in connection with the time markers). The content layering interface 710 can include edit controls that enable a user to add, delete or modify one or more content layers of the foundational content. Example edit controls include adding a content layer, deleting a content layer, splitting a single content layer into two or more content layers, editing properties of a content layer, and the like.

In the example of FIG. 7, the content timeline indicator 712 can visually assist a user in determining a temporal position of a content layer or content item, or cue in the foundational content. For instance, the content timeline indicator 712 can comprise a time marker representing a cue, such as a temporal start point or a temporal end point for a content layer or a content item in the content layer. In certain implementations, the length of the content timeline indicator 712 can adapt according to the overall duration of the collaboratively-created creation, or can be adjusted according to a user-setting.

Figure 8:
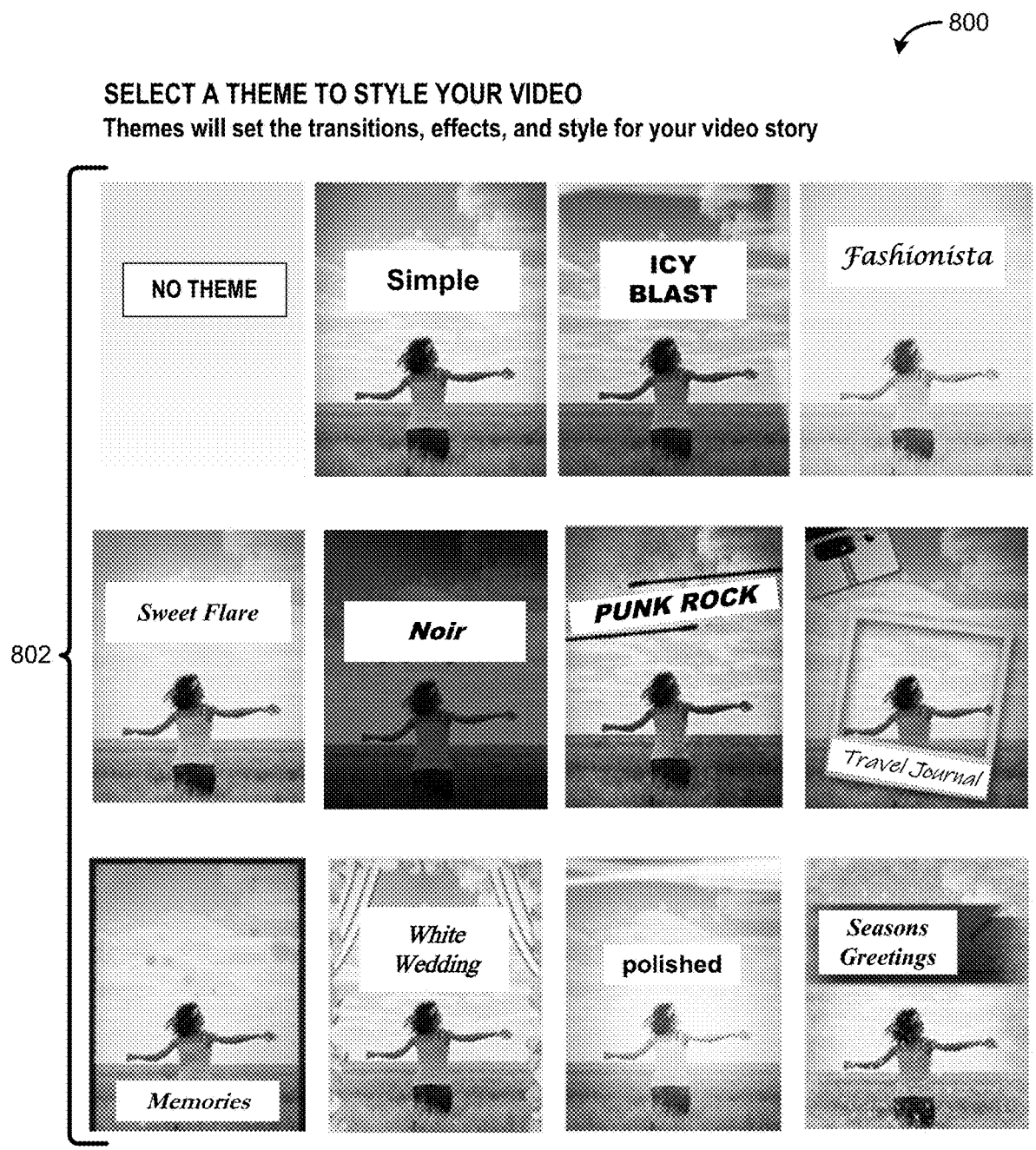
FIG. 8 depicts an example of an interface for selecting a theme for application in accordance with some implementations.

FIG. 8 depicts an example of an interface 800 for selecting a theme for application in accordance with some implementations. In the example of FIG. 8, the interface 800 presents a selection of themes that can be applied to a foundational content including, for example, a simple theme, an "icy blast" theme, a fashionista theme, a "sweet flare" theme, a noir theme, a punk rock theme, a travel journal theme, a memories theme, a white wedding theme, a polished theme, and a season's greetings theme.

According to some implementations, selection of a theme listed in the interface 800 can provide a user with information regarding the selected theme, such as one or more licensing parameters (e.g., use restrictions) associated with the selected theme, costs associated with use of the selected theme, authorship of the selected theme, a written description of the selected theme, a listing of theme-based effects applied by the selected theme, and the like. When a user proceeds with application of a selected theme, some implementations can prompt the user for payment information and/or prompt the user for payment authorization before the selected theme is applied. With some implementations, the interface 800 can provide the user with a preview of a theme's appearance before it is applied to the foundational content; the preview can be based on foundational content the user is intending to enhance and/or sample foundational content.

Figure 9:
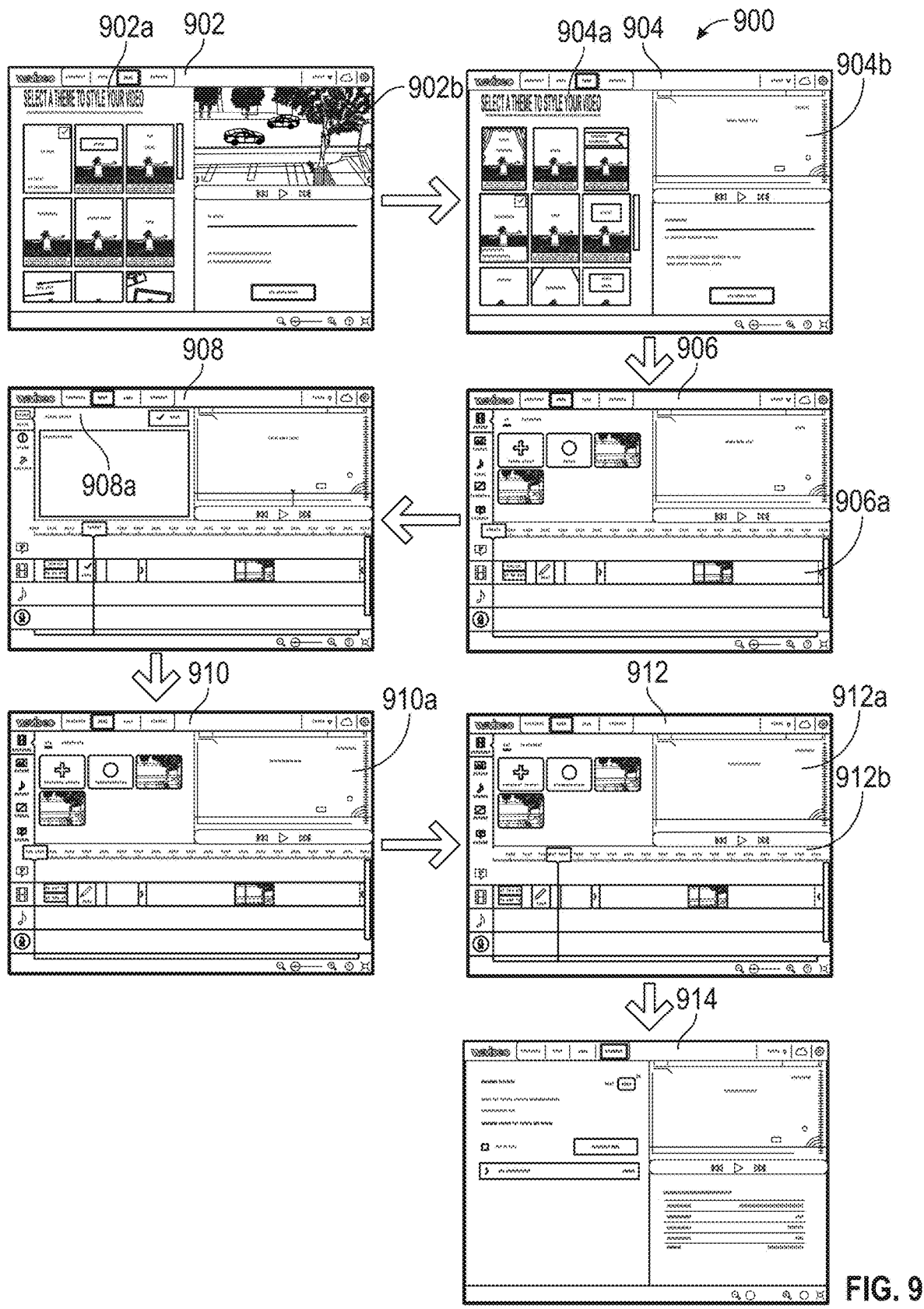
FIG. 9 depicts a flowchart illustrating an example sequence of user interfaces for theme-based effects content editing in accordance with some implementations.

FIG. 9 depicts a flowchart illustrating an example sequence 900 of user interfaces for theme-based effects content editing in accordance with some implementations. In the example of FIG. 9, a user can be presented with user interface 902 that provides access to a listing of themes 902a, from which a user can select from available themes. The selection of a theme can result in a preview 902b of the theme, possibly as applied to foundational content. In some instances, the theme preview 902b can be based on foundational content currently selected by the user or sample foundational content. In certain implementations, the listing 902a can be accessed from a client-side user interface for theme-based effects content editing, similar to those described herein (e.g., client-side user interface 700). User interface 904 depicts a theme being selected in a listing of themes 904a and a preview 904b of the theme before application to foundational content.

In the example of FIG. 9, once a user proceeds with application of a selected theme to foundational content, user interface 906 can transition to a client-side user interface (e.g., client-side user interface 700) that can control content creation, content editing, and theme-related operations with respect to the theme-based foundational content that results from the application of the selected theme. In regard to theme-related operation, user interface 906 can permit a user to adjust one or more theme parameters applicable to the theme(s) currently being applied to the foundational content.

For some implementations, once a theme has been applied to foundational content, the applied theme(s) can be represented as one or more layers 906a on an effect timeline associated with foundational content, and parameters associated with the applied theme(s) can be adjusted, modified, or otherwise manipulated through those layer. For example, where a theme-base effect associated with the applied theme is a text-based effect, such as a caption, title, or lower third, one or more portions of the layer(s) that represent the text-based effect can selected and adjusted for textual content, font, font size text location, or some other text-based effect parameter. In some implementations, upon application of the selected theme to foundational content, user interface 906 can prompt you for parameters for one or more of the theme-based effects associated with the selected theme. For example, where a filter effect, user interface 906 can prompt the user for filter parameters.

In the example of FIG. 9, where a user selects to modify a text-based effect of an applied theme, user interface 908 can present the user with a text box to facilitate the modification. Once the text-based effect has been updated, user interface 910 can present a preview 910a of updated theme-based foundational content. In the example of FIG. 9, user interfaces 912 can present a preview 912a of the theme-based foundational content according to a timeline 912b.

In the example of FIG. 9, user interface 914 can present a user with options for generating a rendered theme-based content product, from the theme-based foundational content, for share and/or consumption with others (e.g., for consumption outside of user interface 914). Options for generating the rendered theme-based content product can include, for example, render quality (e.g., 780p, or 1080p), media format (e.g., MPG, AVI, or MOV), compression (e.g., H.264), publication target (e.g., YouTube®), and the like. For some implementations, user interface 914 can enable a user to publish the rendered theme-based content product to a third-party online media service, such as YouTube®, possibly using the user's preexisting account at the online media service.

Figure 10:
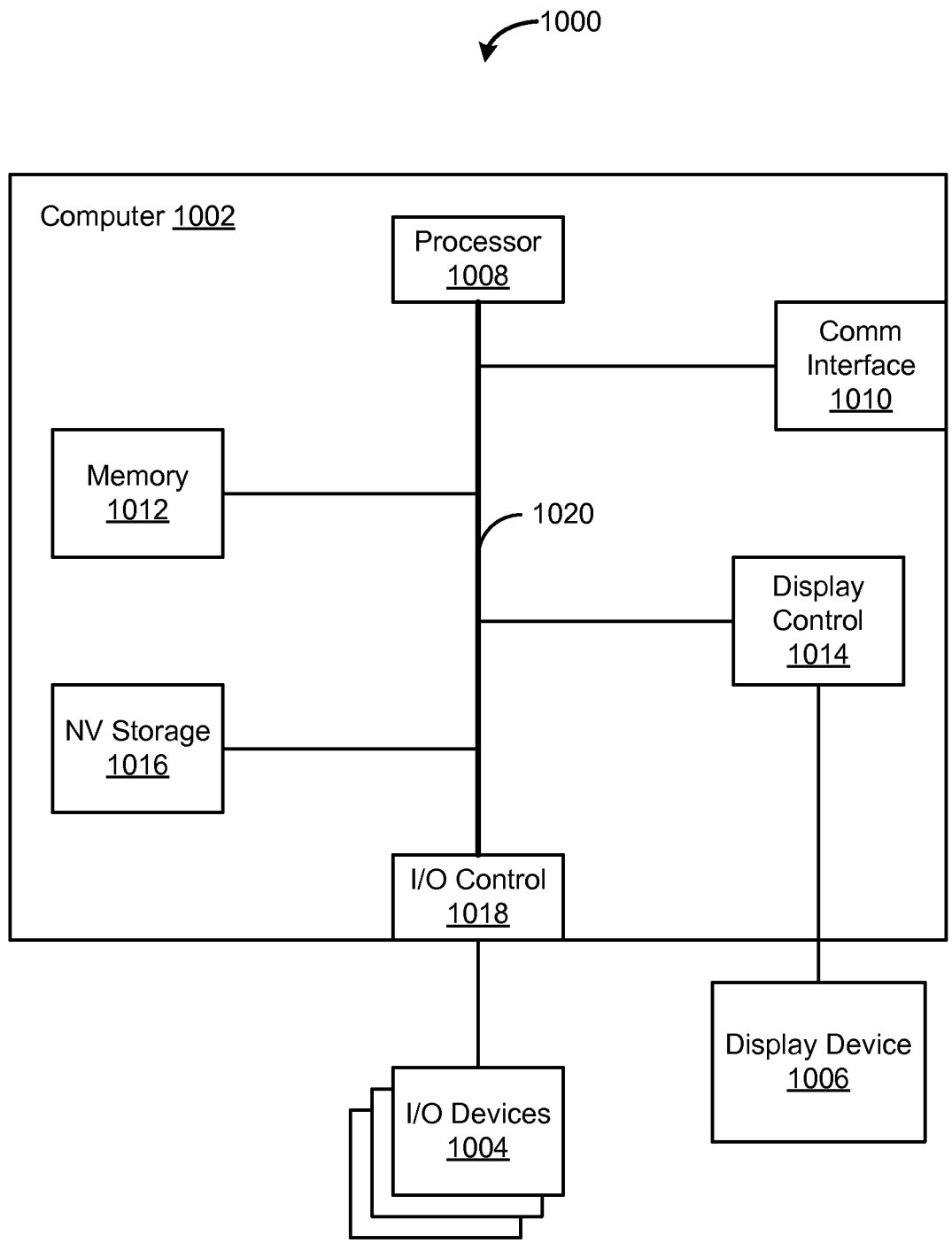
FIG. 10 depicts an example of a system on which techniques described herein can be implemented.

FIG. 10 shows an example of a system on which techniques described in this paper can be implemented. The computer system 1000 can be a conventional computer system that can be used as a client computer system, such as a wireless client or a workstation, or a server computer system. The computer system 1000 includes a computer 1002, I/O devices 1004, and a display device 1006. The computer 1002 includes a processor 1008, a communications interface 1010, memory 1012, display controller 1014, non-volatile storage 1016, and I/O controller 1018. The computer 1002 may be coupled to or include the I/O devices 1004 and display device 1006.

The computer 1002 interfaces to external systems through the communications interface 1010, which may include a modem or network interface. It will be appreciated that the communications interface 1010 can be considered to be part of the computer system 1000 or a part of the computer 1002. The communications interface 1010 can be an analog modem, ISDN modem, cable modem, token ring interface, satellite transmission interface (e.g. "direct PC"), or other interfaces for coupling a computer system to other computer systems.

The processor 1008 may be, for example, a conventional microprocessor such as an Intel Pentium microprocessor or Motorola power PC microprocessor. The memory 1012 is coupled to the processor 1008 by a bus 1020. The memory 1012 can be Dynamic Random Access Memory (DRAM) and can also include Static RAM (SRAM). The bus 1020 couples the processor 1008 to the memory 1012, also to the non-volatile storage 1016, to the display controller 1014, and to the I/O controller 1018.

The I/O devices 1004 can include a keyboard, disk drives, printers, a scanner, and other input and output devices, including a mouse or other pointing device. The display controller 1014 may control in the conventional manner a display on the display device 1006, which can be, for example, a cathode ray tube (CRT) or liquid crystal display (LCD). The display controller 1014 and the I/O controller 1018 can be implemented with conventional well known technology.

The non-volatile storage 1016 is often a magnetic hard disk, an optical disk, or another form of storage for large amounts of data. Some of this data is often written, by a direct memory access process, into memory 1012 during execution of software in the computer 1002. One of skill in the art will immediately recognize that the terms "machine-readable medium" or "computer-readable medium" includes any type of storage device that is accessible by the processor 1008 and also encompasses a carrier wave that encodes a data signal.

The computer system 1000 is one example of many possible computer systems which have different architectures. For example, personal computers based on an Intel microprocessor often have multiple buses, one of which can be an I/O bus for the peripherals and one that directly connects the processor 1008 and the memory 1012 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1012 for execution by the processor 1008. A Web TV system, which is known in the art, is also considered to be a computer system, but it may lack some of the features shown in FIG. 10, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

As disclosed in this paper, implementations allow editors to create professional productions using themes and based on a wide variety of amateur and professional content gathered from numerous sources. Although the foregoing implementations have been described in some detail for purposes of clarity of understanding, implementations are not necessarily limited to the details provided.

We claim:

1. A system comprising:
one or more hardware processors; and
memory storing instructions that, when executed by the one or more hardware processors, cause the one or more hardware processors to:
obtain, over a network, a plurality of digital media editing themes from a plurality of remote data sources, each digital media editing theme of the plurality of digital media editing themes having a respective native format, each digital media editing theme of the plurality of digital media editing themes having a plurality of theme-based effects;
convert each digital media editing theme of the plurality of digital media editing themes from their respective native format into a common format that is common across a theme-based effects library datastore;
store each converted digital media editing theme of the plurality of converted digital media editing themes in the theme-based effects library datastore in the common format;
receive, over the network from a particular content editor client of a plurality of content editor clients, foundational digital media content comprising a plurality of content layers and a computer-implemented request to apply a particular converted digital media editing theme of the plurality of converted digital medial editing themes to the foundational digital media content, wherein the plurality of content layers of the foundational digital media content comprises a graphical content layer, a video content layer, a soundtrack content layer, and an audio recording content layer, and the plurality of theme-based effects of the particular converted digital media editing theme include a visual overlay and a text-based overlay;

split a first content layer of the plurality of content layers into a second content layer and a third content layer;

obtain the particular converted digital media editing theme from the theme-based effects library datastore;

adjust an effect timeline of each theme-based effect of the particular converted digital media editing theme to align a plurality of cues of the effect timeline with a plurality of cues of a content timeline associated with the foundational digital media content, the plurality of cues of the content timeline comprising a beginning of a portion of the content, an end of a portion of the content, a position of a transition between different portions of the content, and a timestamp on the content timeline associated with metadata;

apply, subsequent to the adjustment, the particular converted digital media editing theme to the second content layer of the foundational digital media content;

apply, in response to instructions received from a user, the particular converted digital media editing theme to a lower definition version of the foundational digital media content for user preview by the user while the foundational media content is being actively edited during a same editing session, and then apply the particular converted digital media editing theme to a higher definition version of the foundational digital media content in response to conclusion of the user preview and conclusion of the editing of the foundational digital media content.

2. The system of claim 1, wherein the instructions further cause the one or more hardware processors to obtain a licensing parameter associated with the particular converted digital media editing theme, the licensing parameter comprising use limitation data related to one or more of a quality of the theme-based effects, subject matter of the foundational digital media content, a number of times the particular converted digital media editing theme can be used without payment, and a duration of time the particular converted digital media editing theme can be applied to the foundational digital media content.

3. The system of claim 1, wherein the instructions further cause the one or more hardware processors to obtain a licensing parameter associated with the particular converted digital media editing theme, the licensing parameter comprising cost data associated with the particular converted digital media editing theme.

4. The system of claim 3, wherein the instructions further cause the one or more hardware processors to charge for use of the particular converted digital media editing theme according to the cost, and apply the particular converted digital media editing theme to the foundational digital media content upon payment of the cost.

5. The system of claim 1, wherein the instructions further cause the one or more hardware processors to:
process a payment;
permit application of the particular converted digital media editing theme to the foundational digital media content based on a sufficient amount of the payment and a success in processing the payment.

6. The system of claim 1, wherein the instructions further cause the one or more hardware processors to:
generate from the foundational digital media content a rendered theme-based content product after the particular converted digital media editing theme is applied to the foundational digital media content, wherein the rendered theme-based content product is consumable by at least one of one or more content editor clients of the plurality of content editor clients and one or more third parties;
publish the rendered theme-based content product for consumption by the at least one of one or more content editor clients of the plurality of content editor clients and one or more third parties.

7. The system of claim 6, wherein the instructions further cause the one or more hardware processors to:
process a payment;
permit rendering of the foundational digital media content, after application of the particular converted digital media editing theme to the foundational digital media content, based on a sufficient amount of the payment and a success in processing the payment.

8. The system of claim 1, wherein the adjusting the one or more cues of the effect timeline of each theme-based effect of the plurality of theme-based effects comprises compressing one or more portions of the effect timeline.

9. The system of claim 1, wherein the adjusting the one or more cues of the effect timeline of each theme-based effect of the plurality of theme-based effects comprises removing one or more portions of the effect timeline.

10. The system of claim 1, wherein the plurality of content layers of the foundational digital media content comprise one or more of a graphical content layer, a video content layer, a soundtrack content layer, and an audio recording content layer.

* * * * *